United States Patent
Ueda et al.

(10) Patent No.: US 9,674,923 B2
(45) Date of Patent: Jun. 6, 2017

(54) LIGHTING CIRCUIT AND LAMP

(75) Inventors: Yasuhisa Ueda, Osaka (JP); Toshiaki Isogai, Osaka (JP); Kazushige Sugita, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 402 days.

(21) Appl. No.: 14/115,777

(22) PCT Filed: Feb. 22, 2012

(86) PCT No.: PCT/JP2012/001195
§ 371 (c)(1),
(2), (4) Date: Nov. 5, 2013

(87) PCT Pub. No.: WO2012/164785
PCT Pub. Date: Dec. 6, 2012

(65) Prior Publication Data
US 2014/0097764 A1 Apr. 10, 2014

(30) Foreign Application Priority Data

May 27, 2011 (JP) .................................. 2011-119201
Aug. 11, 2011 (JP) .................................. 2011-176183

(51) Int. Cl.
*H05B 37/02* (2006.01)
*H05B 33/08* (2006.01)
(Continued)

(52) U.S. Cl.
CPC ............ *H05B 37/02* (2013.01); *H02M 3/155* (2013.01); *H05B 33/0818* (2013.01); *H02M 2001/0006* (2013.01); *Y02B 20/346* (2013.01)

(58) Field of Classification Search
CPC  H05B 37/02; H05B 33/0818; H05B 33/0815; H05B 33/0848; H05B 33/0866;
(Continued)

(56) References Cited

U.S. PATENT DOCUMENTS 6,577,512 B2 * 6/2003 Tripathi ............. H05B 33/0815
363/21.15
2004/0090805 A1 5/2004 Kitano
(Continued)

FOREIGN PATENT DOCUMENTS

CN 1499704 A 5/2004
CN 101447735 A 6/2009
(Continued)

OTHER PUBLICATIONS

Office Action for corresponding Chinese Application No. CN201280027167.6 dated Sep. 29, 2014 (with partial English translation).
(Continued)

*Primary Examiner* — Jimmy Vu
*Assistant Examiner* — Henry Luong
(74) *Attorney, Agent, or Firm* — Renner, Otto, Boisselle & Sklar, LLP

(57) ABSTRACT

A lighting circuit (1) includes a controller integrated circuit (U1) for on and off control of a switching element (Q1), a transformer (T1) having a primary coil (T11) that is connected in series to the switching element and a secondary coil (T12), a first voltage supply circuit supplying a voltage that occurs across both ends of the primary coil to an LED module (2), and a second voltage supply circuit supplying a voltage induced in the secondary coil to a power source terminal (Vcc) when the switching element is on. A turns ratio N of the primary coil to the secondary coil satisfies Equation 1, where X1 V denotes a voltage that an AC power source supplies, Y V denotes the maximum value of a power source voltage of the control unit at which normal operation is guaranteed, and Z V denotes the minimum value of the power source voltage.

8 Claims, 18 Drawing Sheets

(51) Int. Cl.
*H02M 3/155* (2006.01)
*H02M 1/00* (2006.01)

(58) Field of Classification Search
CPC .......... H02M 3/155; H02M 3/10; H02M 3/00; H02M 2001/0006; Y02B 20/346
USPC ........ 315/200 R, 205, 209 R, 212, 219, 217, 315/291
See application file for complete search history.

(56) References Cited

U.S. PATENT DOCUMENTS

| | | |
|---|---|---|
| 2007/0267984 A1 | 11/2007 | Peng |
| 2008/0278092 A1 | 11/2008 | Lys et al. |
| 2009/0134859 A1 | 5/2009 | Shiroyama |
| 2010/0308733 A1* | 12/2010 | Shao .................. H02M 1/4225 315/119 |

FOREIGN PATENT DOCUMENTS

| | | |
|---|---|---|
| JP | 08-317650 A | 11/1996 |
| JP | 2000-339049 A | 12/2000 |
| JP | 3488709 B | 10/2003 |
| JP | 2004-350361 A | 12/2004 |
| JP | 2005-124252 A | 5/2005 |

OTHER PUBLICATIONS

European Search Report for corresponding European Application No. 12793984.1 dated Oct. 1, 2014.
International Search Report for corresponding International Application No. PCT/JP2012/001195, mailed May 29, 2012.
Written Opinion for corresponding International Application No. PCT/JP2012/001195, dated May 29, 2012.

* cited by examiner

FIG. 6
(a) Discontinuous mode
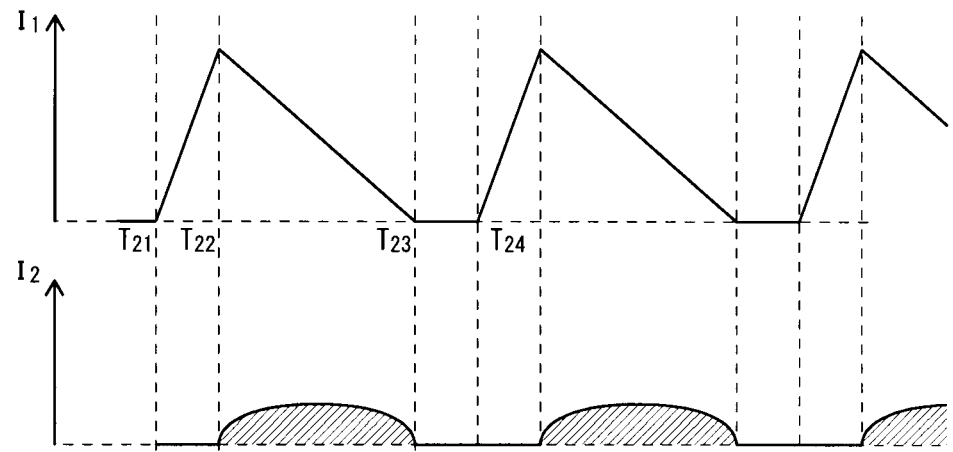
(b) Critical mode
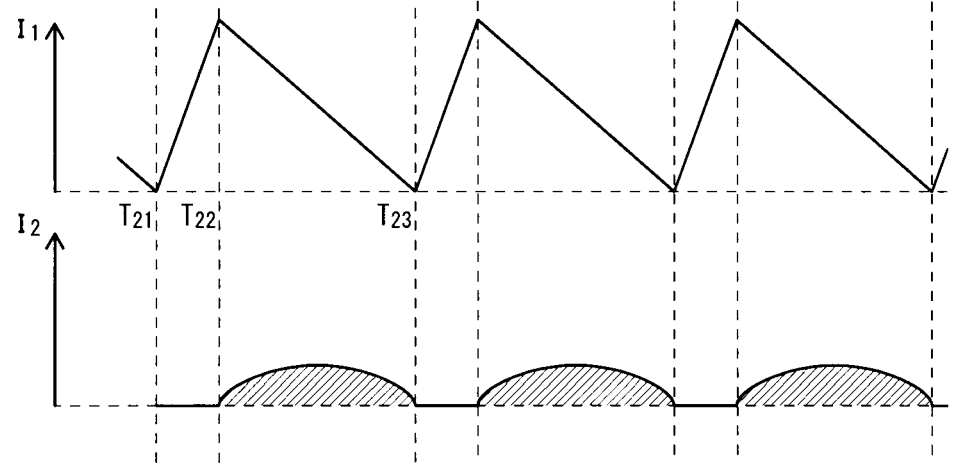
(c) Continuous mode
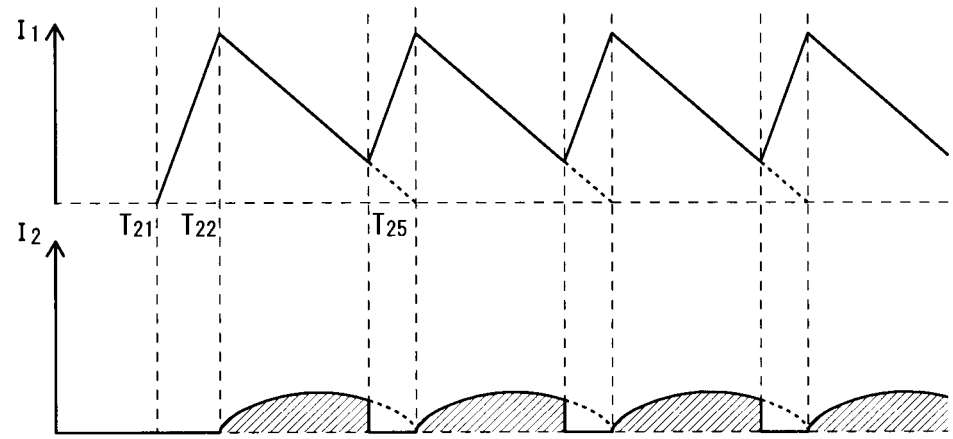

FIG. 10
(a) 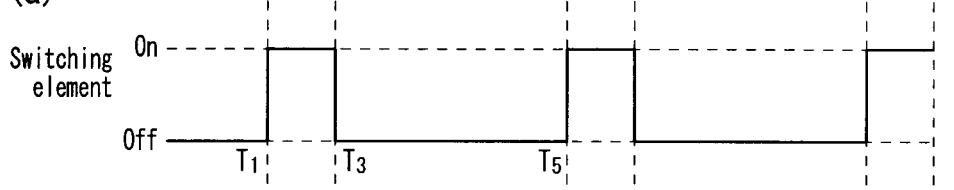
(b) 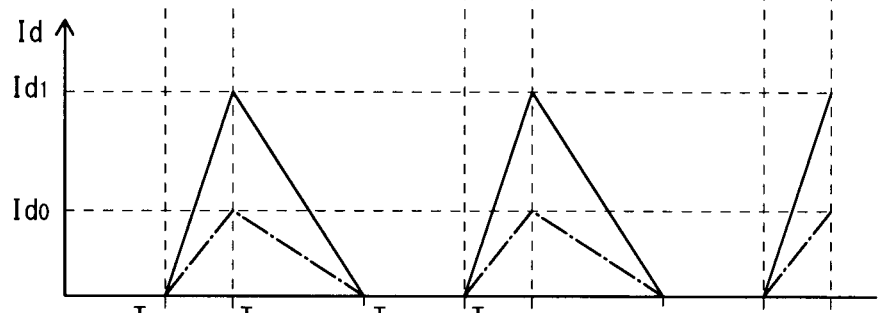
(c) 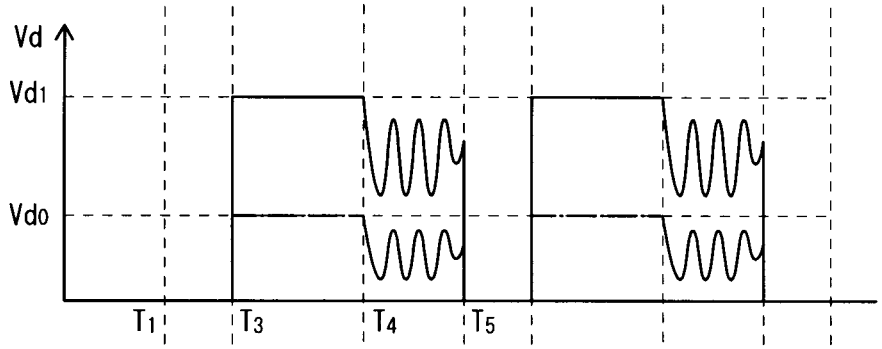
(d) 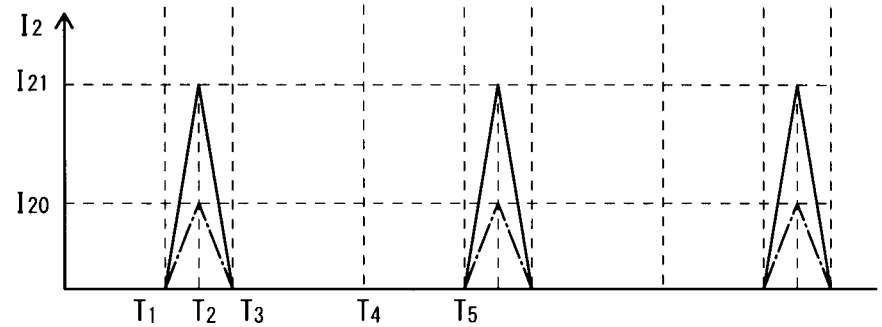

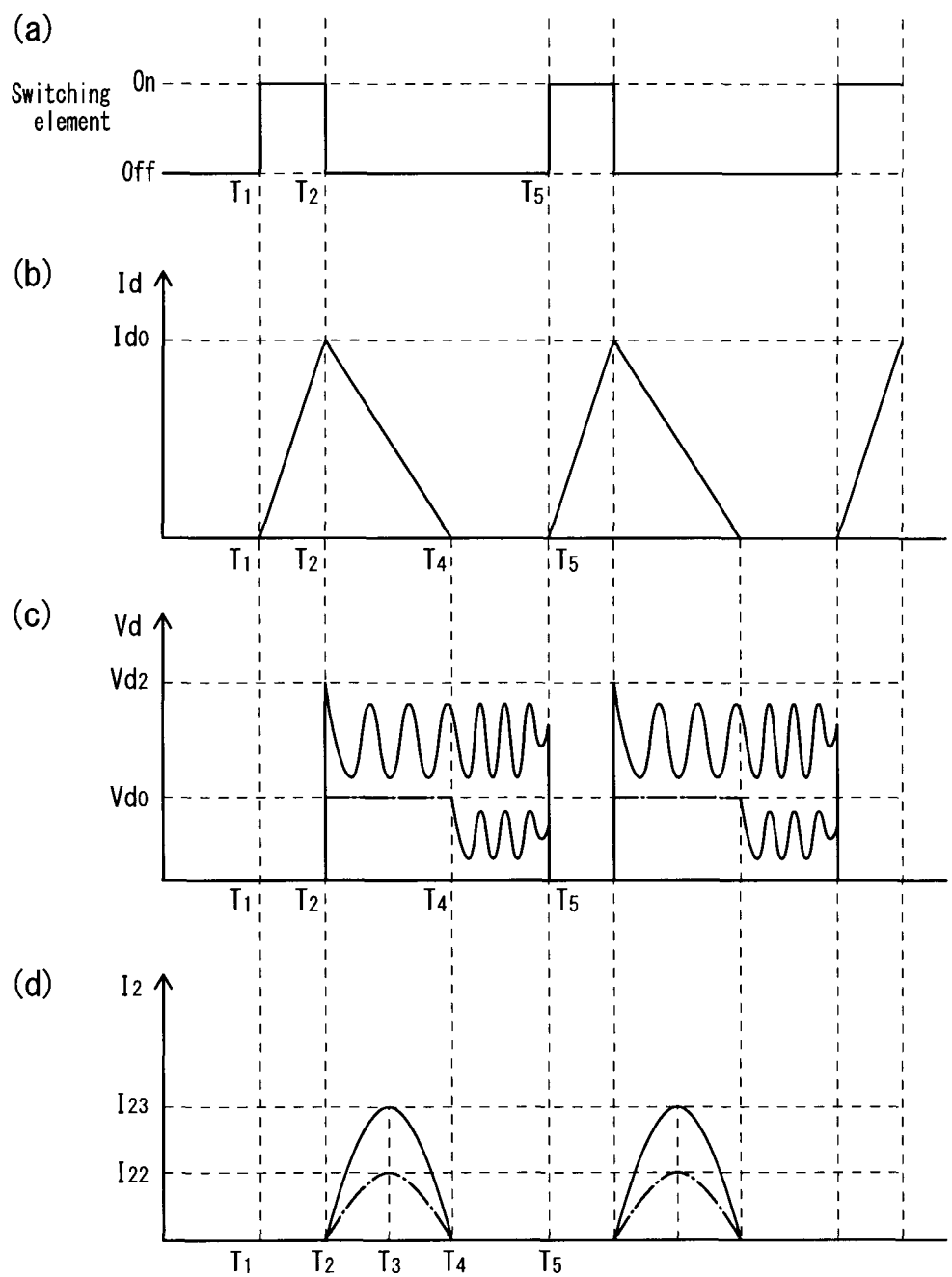

LIGHTING CIRCUIT AND LAMP

TECHNICAL FIELD

The present invention relates to a lighting circuit that receives a power supply from an alternating current (AC) power source and lights a light source such as a light-emitting diode (LED), and a lamp that includes the lighting circuit.

BACKGROUND ART

A power source circuit including a direct current (DC) to DC converter that includes a coil and a switching element has been proposed in conventional technology (Patent Literature 1). Such power source circuits can be used as lighting circuits to supply power to light sources.

The power source circuit disclosed in Patent Literature 1 includes a rectifying and smoothing circuit, a transformer, a switching element, a control circuit, a diode, and a capacitor. The rectifying and smoothing circuit rectifies and smoothes AC current supplied from an AC power source, and then outputs the current. The transformer includes a power source side coil and a load side coil magnetically connected to the source side coil. One end of the power source side coil is connected to the high potential side of the rectifying and smoothing circuit. The switching element is connected to the other end of the power source side coil. The control circuit carries out on and off control of the switching element. The diode and the capacitor are for rectifying and smoothing a voltage induced at the load side coil, and supplying the voltage to a load such as a light source.

This lighting circuit further includes a voltage supply coil that is magnetically connected to the power source side coil. The voltage supply coil is for supplying a driving voltage to a power source terminal of the control circuit.

CITATION LIST

Patent Literature

[Patent Literature 1]
Japanese Patent Publication No. 3488709

SUMMARY OF INVENTION

Technical Problem

A guaranteed operating range is typically set to define a range for a voltage supplied to a power source terminal of a control circuit.

However, in the power source circuit disclosed in Patent Literature 1, a turns ratio of the power source side coil to the voltage supply coil of the transformer is not specified. As such, there is a risk of the power source voltage supplied from the voltage supply coil to the power source terminal of the control circuit being lower than the guaranteed operating range of the control circuit, due to the turns ratio being too high, which leads to malfunction of the control circuit. Similarly, there is a risk of the power source voltage being too high, due to the turns ratio being too low, which leads to failure of the control circuit.

The present invention is provided in light of the above technical problem, and aims to provide a lighting circuit that prevents such malfunctions and failures.

Solution to Problem

To achieve the aim mentioned above, a lighting circuit according to the present invention receives a power supply from an AC power source and lights a light source, and comprises: a rectifying and smoothing circuit configured to rectify and smooth AC current supplied from the AC power source; a switching element connected to the rectifying and smoothing circuit; a control unit configured to perform control of switching the switching element between an on state and an off state; a transformer including a primary coil and a secondary coil, the primary coil connected in series to the switching element, a voltage being induced across both ends of the secondary coil by current flowing through the primary coil; a first voltage supply circuit configured to supply a voltage that occurs across both ends of the primary coil to the light source; and a second voltage supply circuit connected between the secondary coil and a power source terminal of the control unit and configured to supply the voltage induced in the secondary coil to the power source terminal when the switching element is in the on state, wherein a turns ratio N of the primary coil to the secondary coil satisfies Equation 1, where X1 V denotes a voltage that the AC power source supplies, Y V denotes the maximum value of a voltage range of a power source voltage of the control unit at which normal operation of the control unit is guaranteed, and Z V denotes the minimum value of the voltage range of the power source voltage of the control unit at which normal operation of the control unit is guaranteed.

$$\frac{1.2 \times X1}{Y} \leq N \leq \frac{1.2 \times X1}{Z} \qquad [\text{Equation 1}]$$

Advantageous Effects of Invention

According to this configuration, by setting the turns ratio N of the primary coil to the secondary coil according to Equation 1 above, the voltage supplied to the power source terminal of the control unit is ensured to be within the guaranteed operating range of the power source voltage of the control unit. Thus, malfunction of the control unit caused by an insufficiency of voltage supplied to the power source terminal of the control unit, and failure due to destruction of the control unit, can be prevented.

Further, a lighting circuit according to the present invention may receive a power supply from an AC power source and light a light source, and comprise: a rectifying and smoothing circuit configured to rectify and smooth AC current supplied from the AC power source; a switching element connected to the rectifying and smoothing circuit; a control unit configured to perform control of switching the switching element between an on state and an off state; a transformer including a primary coil and a secondary coil, the primary coil connected in series to the switching element, a voltage being induced across both ends of the secondary coil by current flowing through the primary coil; a first voltage supply circuit configured to supply a voltage that occurs across both ends of the primary coil to the light source; and a second voltage supply circuit connected between the secondary coil and a power source terminal of the control unit and configured to supply the voltage induced in the secondary coil to the power source terminal when the switching element is in the off state, wherein a turns ratio N of the primary coil to the secondary coil satisfies Equation 2, where X2 V is a rated voltage of the light source, Y V denotes the maximum value of a voltage range of a power source voltage of the control unit at which normal operation of the control unit is guaranteed, and Z V denotes the minimum value of the voltage range of the power source voltage of the control unit at which normal operation of the control unit is guaranteed.

$$\frac{X2}{Y} \leq N \leq \frac{X2}{Z}$$ [Equation 2]

According to this configuration, by establishing the turns ratio N of the primary coil to the secondary coil according to Equation 2 above, the voltage supplied to the power source terminal of the control unit will be within the guaranteed operating range of the power source voltage of the control unit. Thus, malfunction of the control unit caused by an insufficiency of supplied voltage, and failure due to destruction of the control unit can be prevented.

In the lighting circuit according to the present invention, a switching frequency of the switching element may be equal to a frequency threshold value determined by the rated voltage of the light source.

According to this configuration, the efficiency of power supply from the AC power source to the light source and the control unit can be increased.

In the lighting circuit according to the present invention, $$f=1.26(1/V \cdot s) \times X2(V)+28.0(1/s)$$ [Equation 3]

may be satisfied, where the frequency threshold value is denoted as fkHz.

The lighting circuit according to the present invention may further comprise a zener diode that is connected across both ends of the secondary coil. The control unit may include a current detection circuit that detects a current flowing through the zener diode, and, upon detection of a current exceeding a reference value by the current detection circuit, the control unit maintains the control of the switching element in a suspended state.

According to this configuration, the control unit maintains the control of the switching element in the suspended state upon detecting an amount of current flowing through the zener diode that is greater than a reference current value. Accordingly, by setting the reference current value equal to or lower than a maximum permissible current value of the zener diode, excess current flow through the zener diode can be prevented. Thus, while protecting the control unit, destruction of the zener diode can also be prevented.

In the lighting circuit according to the present invention, the second voltage supply circuit may supply voltage induced at the secondary coil to the power source terminal when the switching element is in the on state.

In the lighting circuit according to the present invention, the second voltage supply circuit may supply voltage induced at the secondary coil to the power source terminal when the switching element is in the off state.

The lighting circuit according to the present invention may further comprise a resistor connected in series to the zener diode. The current detection unit may detect the current flowing through the zener diode by detecting a value of a current flowing through the resistor.

The present invention may be a lamp comprising the lighting circuit.

BRIEF DESCRIPTION OF DRAWINGS

FIG. 6 is a diagram for explaining operations of the lighting circuit pertaining to embodiment 1.

FIG. 10 is a diagram for explaining operations of the lighting circuit pertaining to embodiment 2.

FIG. 12 is a diagram for explaining operations of the lighting circuit pertaining to embodiment 2.

DESCRIPTION OF EMBODIMENTS

<Embodiment 1>
<1> Configuration

Figure 1:
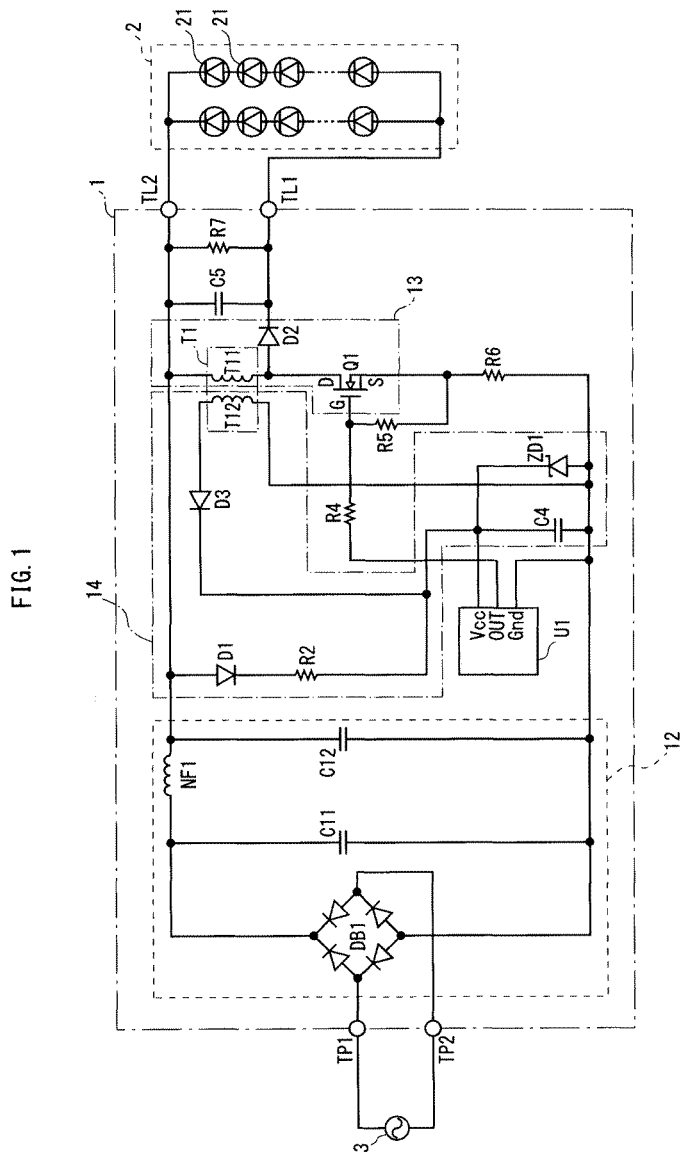
FIG. 1 is a circuit diagram of a lighting circuit pertaining to embodiment 1.

FIG. 1 is a circuit diagram of a lighting circuit pertaining to the present embodiment.

A lighting circuit 1 is connected to an AC power source 3 via power source terminals TP1 and TP2, and to an LED module 2 via output terminals TL1 and TL2.

The LED module 2 is composed of a plurality of sets (2 sets in FIG. 1) of LEDs 21 that are connected in series. The plurality of sets of LEDs 21 are connected in parallel. Each LED 21 is lit by power supplied from the AC power source 3 via the lighting circuit 1.

The lighting circuit 1 essentially includes a rectifying and smoothing circuit 12, a buck-boost DC to DC converter 13, a power supply circuit 14, and a controller integrated circuit U1.

The rectifying and smoothing circuit 12 includes a diode bridge DB1, a capacitor C11 that is connected across the output ends of the diode bridge DB1, and a series circuit composed of a coil NF1 and an electrolytic capacitor C11. The series circuit is connected across both ends of the capacitor C11. The rectifying and smoothing circuit 12 outputs voltage across both ends of the electrolytic capacitor C12.

The DC to DC converter 13 includes a primary coil (power source side coil) T11 of a transformer T1, a switching element Q1 that is composed of an N-channel MOS transistor, and a diode D2. The DC to DC converter 13 is connected to the output terminals TL1 and TL2 via a parallel circuit configured with a resistor R7 and a capacitor C5 that is connected across the output ends of the DC to DC converter 13. A first voltage supply circuit is formed from the diode D2, the capacitor C5, and the resistor R7, and supplies the voltage that occurs across both ends of the primary coil T11 to the LED module 2.

One end side of the primary coil T11 of the transformer T1 is connected to an output end of the high potential side of the rectifying and smoothing circuit 12. Another end side of the primary coil T11 of the transformer T1 is connected to the drain of the switching element Q1.

The switching element Q1 includes a gate G, a drain D and a source S. The gate G is electrically connected to the controller integrated circuit U1 via a resistor R4, the drain D is connected to the other end side of the primary coil T11 of the transformer T1, and the source S is connected to an output end of the low potential side of the rectifying and smoothing circuit 12 via a resistor R6. Further, a resistor R5 is connected across the source and the gate of the switching element Q1. Note that the resistor R4 and the resistor R5 function as gate resistors to prevent parasitic resonance, etc. Further, the resistor R6 is for limiting the flow of current to the switching element Q1 when the switching element Q1 is in an on state.

The diode D2 is connected between a node between the drain D of the switching element Q1 and the primary coil T11 of the transformer T1, and the output terminal TL1. Note that the diode D2 is connected such that a forward direction thereof is from the node between the switching element Q1 and the primary coil T11 and toward the output terminal TL1.

The power supply circuit 14 includes a series circuit that includes a diode D1 and a resistor R2, a capacitor C4, a diode D3, and a zener diode ZD1. The diode D1 and the resistor R2 are connected in series between the output end of the high potential side of the rectifying and smoothing circuit 12 and a power source terminal Vcc of the controller integrated circuit U1. The capacitor C4 is connected between the power source terminal Vcc of the controller integrated circuit U1 and the output end of the low potential side of the rectifying and smoothing circuit 12. The diode D3 is connected between a secondary coil T12 of the transformer T1 and the power source terminal Vcc of the controller integrated circuit U1. The zener diode ZD1 is connected across both ends of the capacitor C4. Note that the diode D3 is connected such that a direction of current flow from the secondary coil T12 and toward the power source terminal Vcc of the controller integrated circuit U1 is the positive direction thereof. The diode D3 forms a second voltage supply circuit that supplies voltage induced across the secondary coil T12 to the power source terminal Vcc either when the switching element Q1 is in the on state, or when the switching element Q1 is in an off state. Further, the series circuit that includes the diode D1 and the resistor R2 is configured to, during initial operation of the lighting circuit 1 when power is introduced, direct current from the rectifying and smoothing circuit 12 to the capacitor C4 and supply voltage to the power source terminal Vcc of the controller integrated circuit U1. Current is also supplied by this series circuit in the same way during normal operation. The zener diode ZD1 is for preventing excess voltage being applied to the power source terminal Vcc of the controller integrated circuit U1.

The controller integrated circuit U1 performs control of switching the switching element Q1 between an on state and an off state by altering a control voltage applied to the gate G of the switching element Q1. The controller integrated circuit U1 includes the power source terminal Vcc for receiving a supply of an operating voltage, an output terminal OUT for outputting the control voltage, and a terminal Gnd for connecting to the output end of the low potential side of the rectifying and smoothing circuit 12.

<2> Operations

The following is an explanation of operations of the lighting circuit 1 pertaining to the present embodiment. Note that in the following explanation, a "same polarity transformer T1" is a transformer in which, when current flows through the primary coil T11, current also flows through the secondary coil T12. Also, a "different polarity transformer T1" is a transformer in which, when current flows through the primary coil T11, current does not flow through the secondary coil T12 due to the effect of the diode D3. However, depending on the circuit connected to the transformer T1, even in cases where the transformer T1 has the same polarity, the structure of the transformer T1 (winding direction, winding position) may vary.

<2-1> Case Where Polarity of Primary Coil T11 and Secondary Coil T12 of Transformer T1 is the Same Note that there are two methods of forming the transformer T1 such that the primary coil T11 and the secondary coil T12 have the same polarity. Method 1 changes the winding direction. Method 2 changes the position of the start of the winding.

Figure 2:
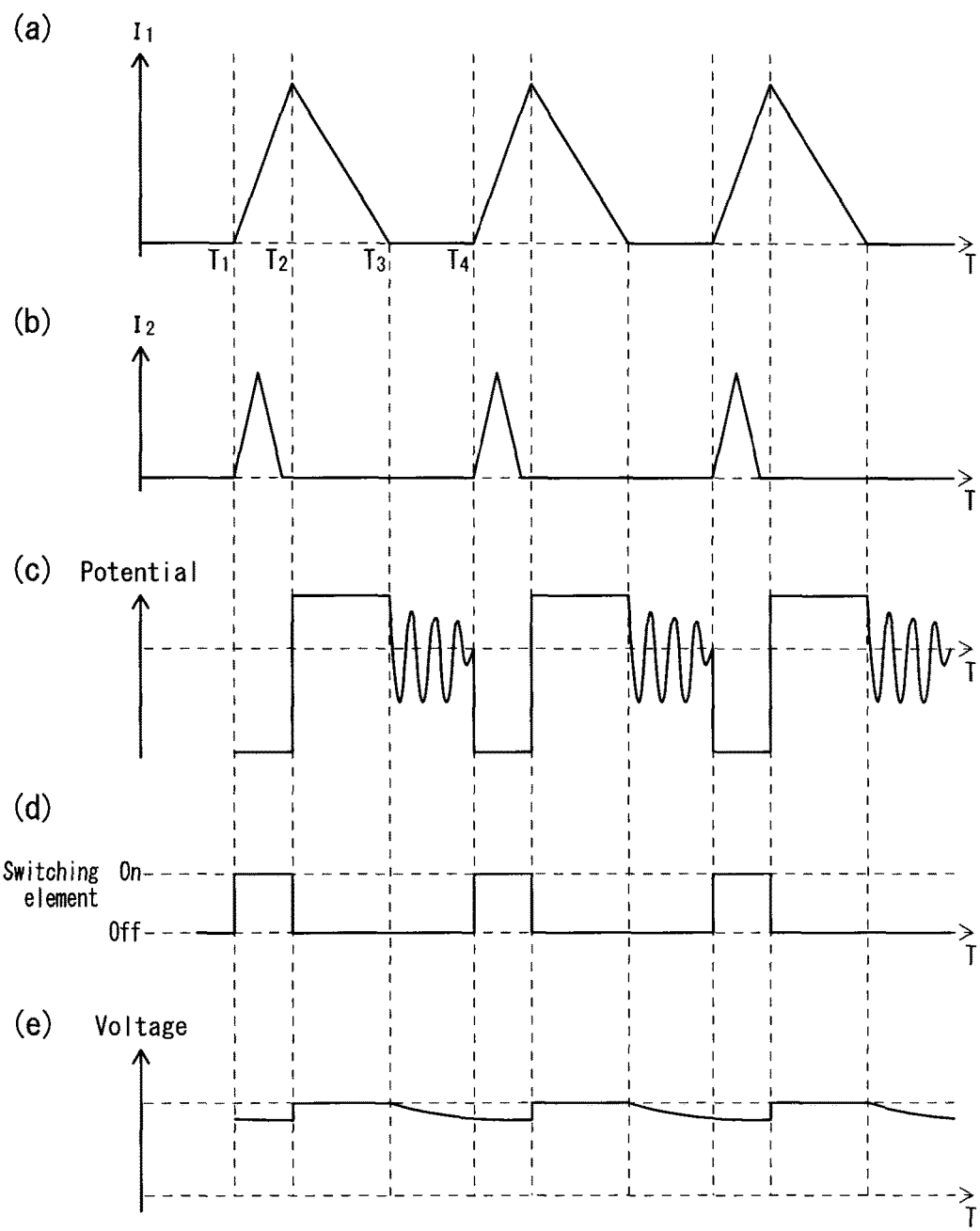
FIG. 2 is a diagram for explaining operations of the lighting circuit pertaining to embodiment 1.

FIG. 2, part (a) illustrates changes in current flowing through the primary coil T11 over time. FIG. 2, part (b) illustrates changes in current flowing through the secondary coil T12 over time. FIG. 2, part (c) illustrates changes in potential at the node between the drain of the switching element Q1 and the primary coil T11 over time. FIG. 2, part (d) illustrates timings at which the switching element Q1 switches on and off. FIG. 2, part (e) illustrates changes in voltage across the output terminal TL1 and the output terminal TL2 of the lighting circuit 1. Note that in FIG. 2, part (e), the voltage becomes positive when the potential of the output terminal TL1 is higher than the potential of the output terminal TL2.

First, after time T1, when the switching element Q1 switches to the on state (refer to FIG. 2, part d), a current I1 flowing through the primary coil T11 gradually increases (refer to FIG. 2, part a). Here, a voltage is generated across the secondary coil T12 where one end side of the secondary coil T12 that is connected to the diode D3 has a higher potential than another end side of the secondary coil T12. Therefore, a current I2 flows from the secondary coil T12 to the diode D3 (refer to FIG. 2, part b). Thus, the capacitor C4, which is connected between the power source terminal Vcc of the controller integrated circuit U1 and the output end of the low potential side of the rectifying and smoothing circuit U1, is charged, and power is supplied to the power source terminal Vcc. At this time, the drain of the switching element Q1 has a higher potential than the output end of the low potential side of the rectifying and smoothing circuit 12 due to the voltage drop of the resistor R6 and the drain-source voltage (VDS).

Next, at time T2, when the switching element Q1 switches to the off state (refer to FIG. 2, part d), the potential of the drain of the switching element Q1 becomes almost equal to the potential of the high potential side of the rectifying and smoothing circuit 12 (refer to FIG. 2, part c). Here, the primary coil T11 attempts to maintain the current that was flowing therethrough when the switching element Q1 was in the on state, and releases the energy stored therein. Consequently, the current I1 flowing through the primary coil T11 gradually decreases. Accordingly, electromotive force is generated in the secondary coil T12 in proportion to the voltage at the primary coil T11. In other words, a voltage is generated across the secondary coil T12 where the one end side of the secondary coil T12 that is connected to the diode D3 has a lower potential than the other end side of the secondary coil T12. Therefore, the diode D3 does not conduct and current does not flow through the secondary coil T12 (refer to FIG. 2, part b). Also, between time T2 and time T3, a voltage is generated across the output terminal TL1 and the output terminal TL2 of the lighting circuit 1 since the output terminal TL1 has a higher potential than the output terminal TL2 (refer to FIG. 2, part e).

Next, after time T3, the potential of the drain of the switching element Q1 fluctuates, reflecting a resonance generated across the primary coil T11 and a parasitic capacitance of the switching element Q1. Here, the voltage across the output terminal TL1 and the output terminal TL2 gradually decreases over a time constant determined by the capacitor C5 and the resistor R7 (refer to FIG. 2, part e). This time constant is sufficiently greater than a switching cycle of the switching element Q1 such that, even if the potential of the drain of the switching element Q1 fluctuates for the same period as the switching cycle, the voltage across the output terminal TL1 and the output terminal TL2 is maintained at a level higher than that required to light each LED 21 in the LED module 2.

Finally, at time T4, the switching element Q1 again switches to the on state, and the current flowing through the primary coil T11 begins to gradually increase.

Figure 3:
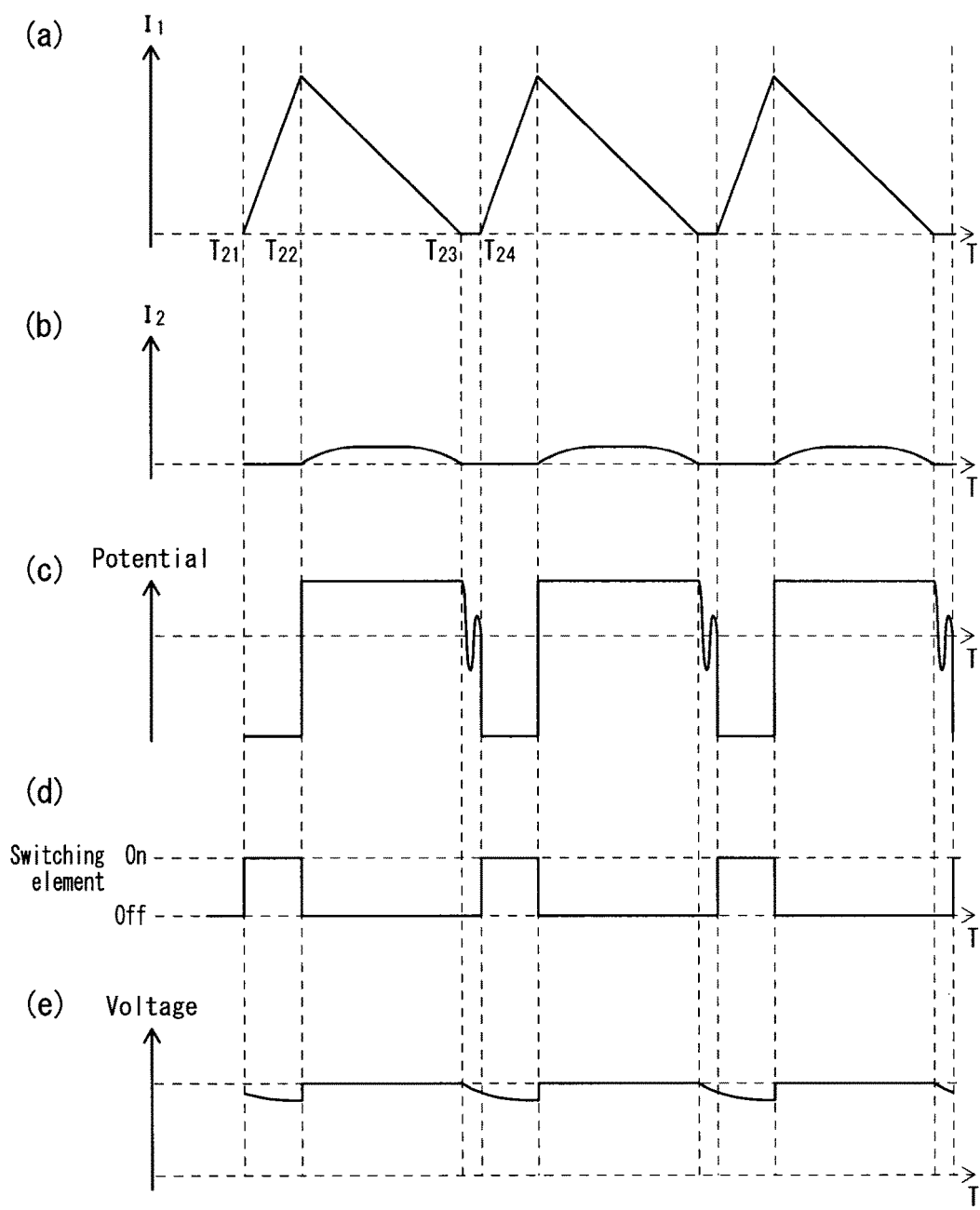
FIG. 3 is a diagram for explaining operations of the lighting circuit pertaining to embodiment 1.

<2-2> Case Where Polarity of Primary Coil T11 and Secondary Coil T12 of Transformer T1 is Different FIG. 3 illustrates changes in current flowing through the primary coil T11 of the transformer 1 over time, changes in current flowing through the secondary coil T12 of the transformer 1 over time, and changes in potential at the node between the drain of the switching element Q1 and the primary coil T11 over time, in relation to timing of the on and off states of the switching element Q1, and on timing of the LED module. Note that in FIG. 3, part (e), the voltage becomes positive when the potential of the output terminal TL1 is higher than the potential of the output terminal TL2.

First, after time T21, when the switching element Q1 switches to the on state (refer to FIG. 3, part d), the current I1 flowing through the primary coil T11 gradually increases (refer to FIG. 3, part a). Accordingly, a voltage is generated across the secondary coil T12 where the one end side of the secondary coil T12 that is connected to the diode D3 has a lower potential than the other end side of the secondary coil T12. Therefore, the diode D3 does not conduct and current does not flow through the secondary coil T12 (refer to FIG. 3, part b). At this time, the drain of the switching element Q1 has a higher potential than the output end of the low potential side of the rectifying and smoothing circuit 12 due to the voltage drop of the resistor R6 and the drain-source voltage (VDS).

Next, at time T22, when the switching element Q1 switches to the off state, the potential of the drain of the switching element Q1 becomes almost equal to the potential of the high potential side of the rectifying and smoothing circuit 12 (refer to FIG. 3, part c). Here, the primary coil T11 attempts to maintain the current that was flowing therethrough when the switching element Q1 was in the on state, and releases the energy stored in the primary coil T11. Consequently, current flowing through the primary coil T11 gradually decreases. Accordingly, electromotive force is generated in the secondary coil T12 in proportion to the voltage at the primary coil T11. In other words, a voltage is generated where the end side of the secondary coil T12 that is connected to the diode D3 has a higher potential than the other end side of the secondary coil T12. Therefore, the diode D3 conducts and the current I2 flows through the secondary coil T12 (refer to FIG. 3, part b). Thus, the capacitor C4, which is connected between the power source terminal Vcc of the controller integrated circuit U1 and the output end of the low potential side of the rectifying and smoothing circuit 12, is charged, and power is supplied to the power source terminal Vcc. Also, between time T22 and time T23, a voltage is generated across the output terminal TL1 and the output terminal TL2 of the lighting circuit 1 since the output terminal TL1 has a higher potential than the output terminal TL2 (refer to FIG. 3, part e).

Next, after time T23, the potential of the drain of the switching element Q1 fluctuates, reflecting the resonance generated across the primary coil T11 and the parasitic capacitance of the switching element Q1. Here, the voltage across the output terminal TL1 and the output terminal TL2 gradually reduces over the time constant determined by the capacitor C5 and the resistor R7 (refer to FIG. 3, part e). This time constant is sufficiently greater than the switching cycle of the switching element Q1 such that, even if the potential of the drain of the switching element Q1 fluctuates for the same period as the switching cycle, the voltage across the output terminal TL1 and the output terminal TL2 is maintained at a level higher than that required to light each LED 21 in the LED module 2.

Finally, at time T24, the switching element Q1 again switches to the on state, and the current flowing through the primary coil T11 begins to gradually increase.

<3> Experimental Results Related to Turns Ratio of Primary Coil T11 to Secondary Coil T12

Experiments were conducted to confirm the operations of the lighting circuit 1 with different turns ratios of the primary coil T11 to the secondary coil T12. The experiments were conducted for each of four effective values of the AC current of the AC power source 3: 100 V, 200 V, 300 V, and 400 V. The AC power source 3 used in these experiments is a power source that outputs an AC voltage having a sinusoidal waveform. The following is a detailed explanation of the experimental results.

Figure 4:
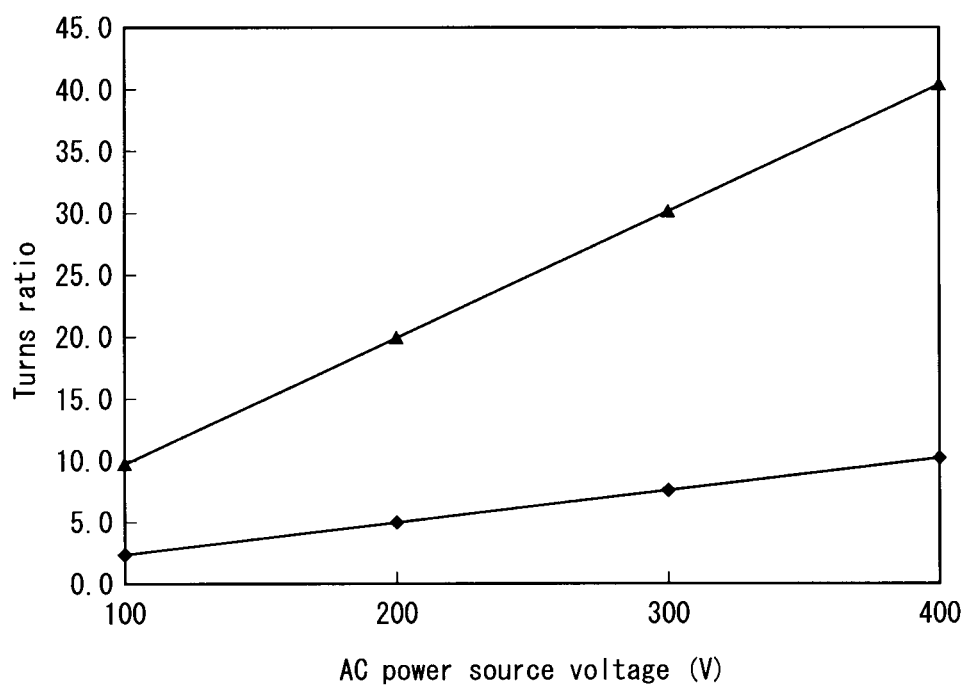
FIG. 4 illustrates experiment results related to the lighting circuit pertaining to embodiment 1.

<3-1> Case Where Polarity of Primary Coil T11 and Secondary Coil T12 of Transformer T1 is the Same FIG. 4 illustrates a relationship between the turns ratio and the AC voltage from the AC power source 3 applied to the input terminal TP1 and TP2 of the lighting circuit 1. For each of the AC voltages 100 V, 200 V, 300 V, or 400 V, in cases where the turns ratio was greater than 10, 20, 30, or 40, respectively, the LED module 2 intermittently switched on and off (flickered). This is thought to indicate that the controller integrated circuit U1 was not operating normally due to an insufficiency in power supplied to the power source terminal Vcc of the controller integrated circuit U1. In other words, this is thought to indicate that the power source voltage supplied to the power source terminal Vcc of the controller integrated circuit U1 was less than the minimum value of the guaranteed operating range of the controller integrated circuit U1.

On the other hand, in cases where the turns ratio was less than 2.5, 5.0, 7.5, or 10.0, respectively, the controller integrated circuit U1 was sometimes destroyed. This is thought to indicate that excess voltage greater than the maximum value of the guaranteed operating range was supplied to the power source terminal Vcc of the controller integrated circuit U1.

According to the above results it can be seen that, when the effective value of the AC current inputted to the lighting circuit 1 from the AC power source 3 is denoted as X1 V, the turns ratio N is to be set so as to satisfy Equation 4.

$$\frac{1.2 \times X1}{48} \leq N \leq \frac{1.2 \times X1}{12} \qquad \text{[Equation 4]}$$

In other words, if the maximum value of the guaranteed operating range of the power source terminal Vcc of the controller integrated circuit U1 is denoted as Y V, and the minimum value of the guaranteed operating range of the controller integrated circuit U1 is denoted as Z V, the turns ratio N is to be set so as to satisfy Equation 5.

$$\frac{1.2 \times X1}{Y} \leq N \leq \frac{1.2 \times X1}{Z} \qquad \text{[Equation 5]}$$

This means that in a case where the polarity of the primary coil T11 and the secondary coil T12 of the transformer T1 is the same, and regardless of a rated voltage of the LED module 2, it suffices that the turns ratio be set by taking into account only the effective value of the AC voltage of the AC power source 3.

Note that, with the circuit configuration illustrated in FIG. 1, given that the effective value of the AC voltage is X1 V, the maximum value of the AC voltage is approximately 1.4×X1 V. Therefore, theoretically speaking, the turns ratio in the transformer T1 would normally be set while assuming that a voltage of 1.4×X1 V is applied across both ends of the primary coil T11.

However, Equation 5, which was derived through experimental results, indicates that the turns ratio N should be set assuming that a maximum voltage of 1.2×X1 V is applied across both ends of the primary coil T11. This is because the power output from the rectifying and smoothing circuit 12 is not entirely expended at the primary coil T11, and is also somewhat altered by a constant of the rectifying and smoothing circuit 12. Therefore, the actual turns ratio of the transformer T1 is preferably set lower than the theoretically derived turns ratio. In other words, it can be understood that there is a need to increase power supplied to the secondary coil T12.

Figure 5:
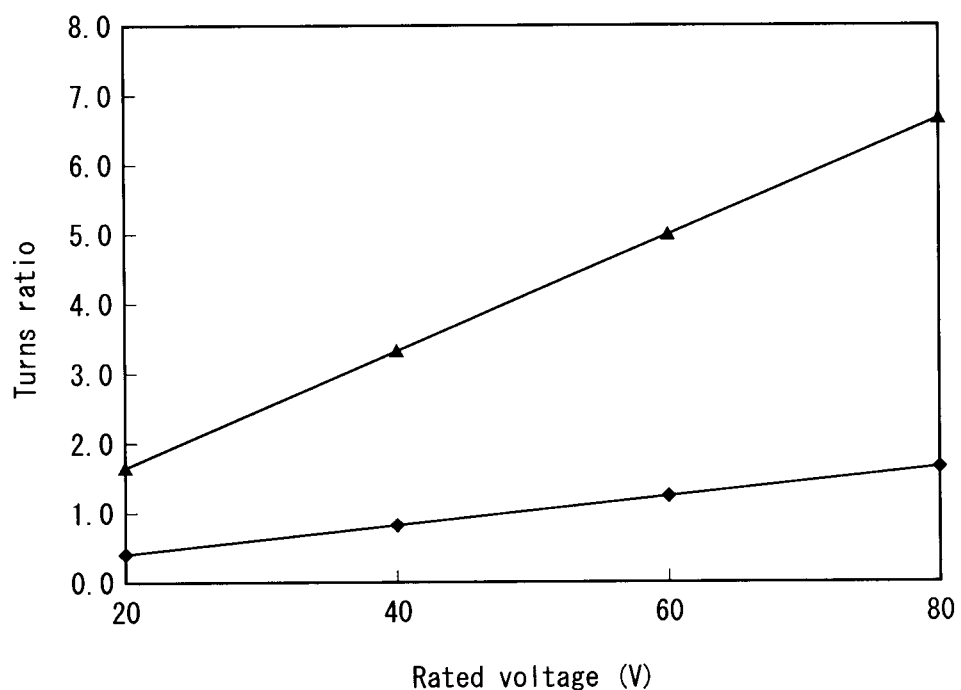
FIG. 5 illustrates experiment results related to the lighting circuit pertaining to embodiment 1.

<3-2> Case Where Polarity of Primary Coil T11 and Secondary Coil T12 of Transformer T1 is Different FIG. 5 indicates a relationship between the rated voltage of the LED module 2 and the turns ratio. For each of the rated voltages 20 V, 40 V, 60 V, or 80 V of the LED module 2, in cases where the turns ratio was greater than 1.7, 3.3, 5.0, or 6.7, respectively, the LED module 2 intermittently switched on and off (flickered). This is thought to indicate that the controller integrated circuit U1 was not operating normally due to an insufficiency in power supplied to the power source terminal Vcc of the controller integrated circuit U1. In other words, this is thought to indicate that the power source voltage supplied to the power source terminal Vcc of the controller integrated circuit U1 was less than the minimum value of the guaranteed operating range of the controller integrated circuit U1.

On the other hand, in cases where the corresponding turns ratio was less than 0.4, 0.8, 1.3, or 1.7, the controller integrated circuit was sometimes destroyed. This is thought to indicate that excess voltage greater than the maximum value of the guaranteed operating range was supplied to the power source terminal Vcc of the controller integrated circuit U1.

According to the above results, when the rated voltage of the LED module 2 is denoted as X2 V, the turns ratio N is to be set so as to satisfy Equation 6.

$$\frac{X2}{48} \leq N \leq \frac{X2}{12} \qquad \text{[Equation 6]}$$

In other words, if the maximum value of the guaranteed operating range of the power source terminal Vcc of the controller integrated circuit U1 is denoted as Y V, and the minimum value of the guaranteed operating range of the controller integrated circuit U1 is denoted as Z V, the turns ratio N is to be set so as to satisfy Equation 7.

$$\frac{X2}{Y} \leq N \leq \frac{X2}{Z} \qquad \text{[Equation 7]}$$

This means that in a case where the polarity of the primary coil T11 and the secondary coil T12 of the transformer T1 is different, and regardless of an effective value of the AC voltage of the AC power source 3, it suffices that the turns ratio be set by taking into account only the rated voltage of the LED module 2.

With a different polarity of the primary coil T11 and the secondary coil T12 in the transformer T1, when the switching element Q1 is in the off state, the voltage induced at the secondary coil T12 is applied to the power source terminal Vcc of the controller integrated circuit U1, as shown in FIG. 3. Further, the amount of voltage induced at the secondary coil T12 is proportionate to the voltage at the primary coil T11, i.e. the voltage at both ends of the LED (Vf).

It has been experimentally established that the rate of change of this change in current becomes greater as the rated voltage X2 of the LED module 2 becomes higher, and becomes less as the rated voltage X2 becomes lower. Accordingly, if the rated voltage of the LED module 2 is higher, the turns ratio N needs to be higher to limit the voltage induced at the secondary coil T12.

Equation 7 reflects the above considerations. As the rated voltage of the LED module 2 increases, the range of values of the turns ratio N also increases.

In conclusion, in the lighting circuit 1 pertaining to the present embodiment, the turns ratio N is to be set, so as to satisfy either Equation 5 or Equation 7, depending upon the winding direction of the primary coil T11 and the polarity of the secondary coil T12. Setting the turns ratio N in such a manner causes a voltage greater than the minimum value of the guaranteed operating range of the controller integrated circuit U1 to be supplied to the power source terminal Vcc. In this way, flickering of the LED module 2 due to malfunction of the lighting circuit 1 can be prevented. In addition, setting the turns ratio N in such a manner also prevents a voltage greater than the maximum value of the guaranteed operating range from being inputted to the power source terminal Vcc, thereby preventing destruction of the controller integrated circuit U1.

<4> Experimental Results Regarding Switching Frequency of Switching Element Q1

Using the lighting circuit 1 in which the primary coil T11 and the secondary coil T12 have different polarities, an LED module 2 having a rated voltage of 31 V was lit using three different switching frequencies of the switching element Q1: a first specified frequency less than 67 kHz, 67 kHz, and a second specified frequency greater than 67 kHz. FIG. 6 illustrates the results of measuring the change of the current I1 flowing through the primary coil T11 over time, and the change of the current I2 flowing through the secondary coil T12 over time.

FIG. 6, part (a) illustrates the results when the LED module 2 was lit while setting the switching frequency to the first specified frequency. As shown in FIG. 6, part (a), first, at time T21, the switching element Q1 switches to the on state and energy starts accumulating at the primary coil T11. Next, at time T22, the switching element Q1 switches to the off state and by time T23 release of the energy accumulated at the primary coil T11 finishes. After that, at time T24, the switching element Q1 again switches to the on state. In other words, there is a period between time T23 and time T24 during which the current I1 does not flow through the primary coil T11, i.e. a period exists during which energy is not accumulating at the primary coil T11, and power is not being supplied to the LED module 2 or to the controller integrated circuit U1 from the primary coil T11. A switching frequency mode as described above is hereafter referred to as a "discontinuous mode".

FIG. 6, part (b) illustrates the results when the LED module 2 was lit while setting the switching frequency to 67 kHz. As shown in FIG. 6, part (b), at time T23, release of the energy accumulated at the primary coil T11 finishes at the same time as the switching element Q1 again switches to the on state. In other words, there is no period during which the current I1 does not flow through the primary coil T11, i.e. at all times either energy is accumulating at the primary coil T11, or power is being supplied to the LED module 2 from the primary coil T11 and to the controller integrated circuit U1. A switching frequency mode as described above is hereafter referred to as a "critical mode".

Note that DC power is always being supplied to the primary coil T11 from the rectifying and smoothing circuit 12. Therefore, when a greater portion of overall time is occupied by periods when energy is accumulating at the primary coil T11 from the rectifying and smoothing circuit 12 (hereafter "energy accumulation period"), the efficiency of power supply to the LED module 2 and the controller integrated circuit U1 from the AC power source 3 increases. Accordingly, when comparing the discontinuous mode and the critical mode, a greater portion of time is occupied by the energy accumulation period in the critical mode. Thus, the increase in the efficiency of power supply to the LED module 2 and the controller integrated circuit U1 is a beneficial point of the critical mode.

Further, in both the discontinuous mode and the critical mode, all of the energy accumulated at the primary coil T11 is released during the period in which the switching element Q1 is in the off state. In other words, all of the energy accumulated at the primary coil T11 is supplied to the LED module 2 and the controller integrated circuit U1.

FIG. 6, part (c) illustrates the results when the LED module 2 was lit while setting the switching frequency to the second specified frequency. As shown in FIG. 6, part (c), at time T22 the switching element Q1 switches to the off state and energy starts being released from the primary coil T11. After that, at time T25 and before the release of the energy accumulated at the primary coil T11 finishes, the switching element Q1 switches to the on state. A switching frequency mode as described above is hereafter referred to as a "continuous mode".

In this continuous mode, release of all the energy accumulated at the primary coil T11 is not completed during the period in which the switching element Q1 is in the on state. In other words, only some of the energy accumulated at the primary coil T11 is supplied to the LED module 2 and the controller integrated circuit U1. That is, comparing the continuous mode to the critical mode, the efficiency of the supply of energy accumulation at the primary coil T11 to the LED module 2 and the controller integrated circuit U1 is lower, and this results in a fall in the efficiency of power supply to the LED module 2 and the controller integrated circuit U1 from the AC power source 3.

According to the above results, the highest efficiency of power supply to the LED module 2 and the controller integrated circuit U1 from the AC power source 3 can be achieved with the critical mode.

Figure 7:
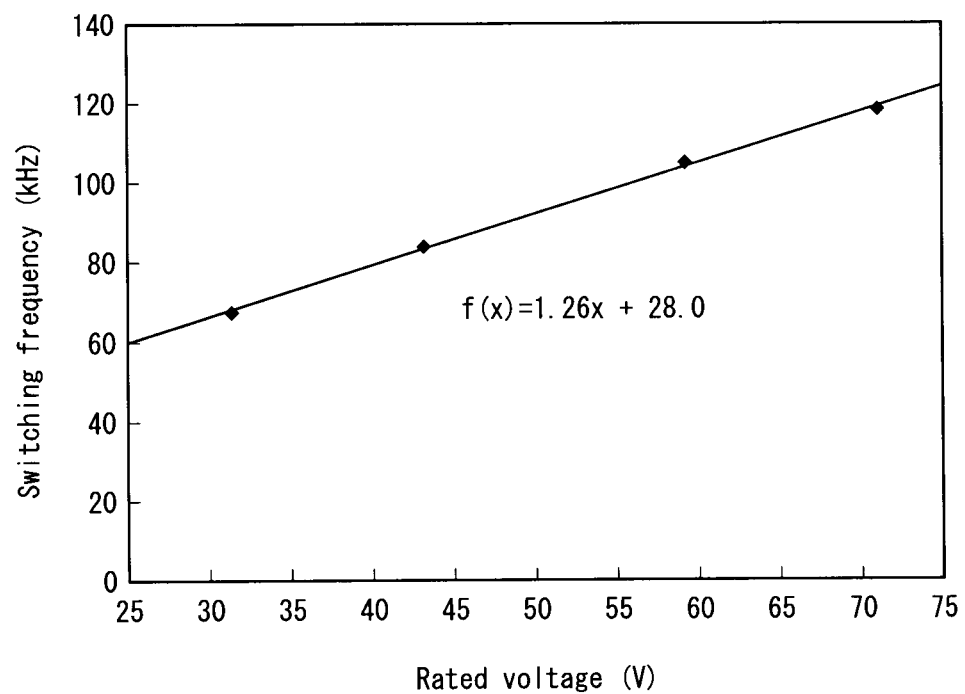
FIG. 7 illustrates experiment results related to the lighting circuit pertaining to embodiment 1.

The experimentally determined results of the relationship between the rated voltage of the LED module 2 and the switching frequency (frequency threshold value) are illustrated in FIG. 7.

The frequency threshold value of four varieties of the LED module 2 were experimentally determined. The four varieties of the LED module 2 had rated voltages of 31.25 V, 43 V, 59.2 V, and 71 V, respectively.

The four data points that were experimentally determined can be connected by a line, as shown in FIG. 7. A frequency threshold value fkHz can be expressed by Equation 8, which is derived from the line. In Equation 8, the rated voltage of the LED module 2 is denoted as X2 V.

$$f=1.26(1/V \cdot s) \times X2(V)+28.0(1/s) \quad \text{[Equation 8]}$$

Accordingly, by setting the switching frequency of the switching element Q1 according to the frequency threshold value derived from the rated voltage of the LED module 2 and Equation 8, it is possible to avoid a drop in the efficiency of power supply to the LED module 2 and the controller integrated circuit U1 from the AC power source 3.

<Embodiment 2>

A power source circuit such as that described in embodiment 1 typically includes a zener diode for preventing destruction of the control circuit of the power source circuit due to excess voltage being applied to the power source terminal of the control unit. The cathode of such a zener diode is connected to a power source terminal of a control circuit and the anode of such a zener diode is connected to the low potential side of a rectifying and smoothing circuit.

Further, a lamp including such a power source circuit (lighting circuit) is typically, after assembly and before shipping, connected to a power source to perform operational tests on the power source circuit.

However, in the operational test, an operator may mistakenly connect a lighting circuit that supports a power source with an output voltage of 100 V to a power source with an output voltage of 220 V, or supply power to a lighting circuit when a light source is not correctly connected to an output terminal of the lighting circuit (i.e. a poor connection state). In such cases, even if excess voltage is generated across both ends of a power source side coil, excess voltage is not applied to the power source terminal of the control circuit due to the function of the zener diode, and the control circuit is thereby protected. However, due to the flow of excess current therethrough, the zener diode may be destroyed. In such a case, the zener diode included in the power source circuit needs replacing before the lamp is shipped, and therefore the operator's workload increases. This leads to the risk of manufacturing costs increasing due to an increase in labor costs.

Regarding the above, the lighting circuit pertaining to the present embodiment has an advantage in that, while protecting the control unit, destruction of the zener diode can also be prevented. The following is a description of the lighting circuit pertaining to the present embodiment.

<Configuration>

Figure 8:
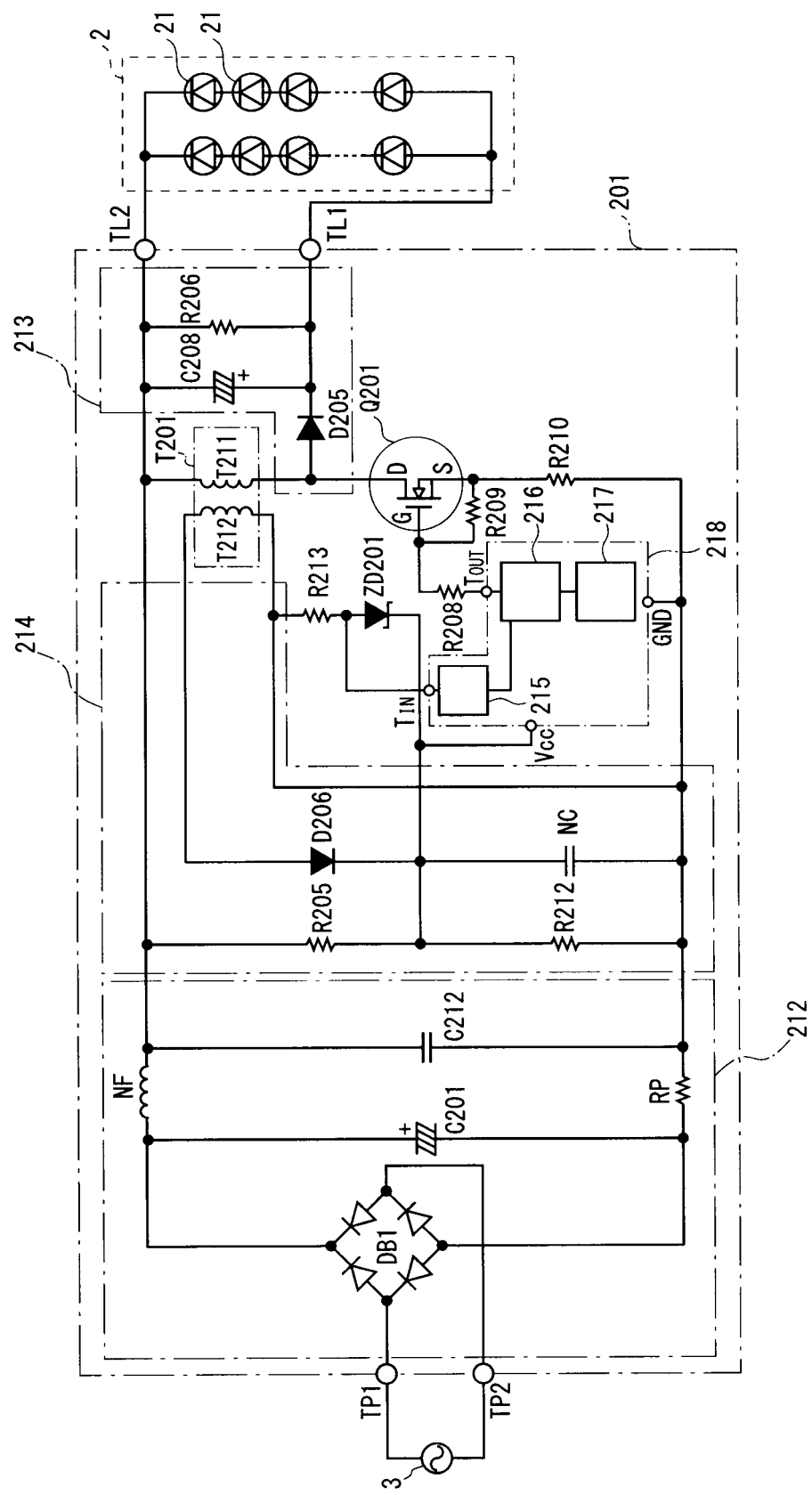
FIG. 8 is a circuit diagram of a lighting circuit pertaining to embodiment 2.

FIG. 8 illustrates a circuit diagram of the lighting circuit pertaining to the present embodiment.

The lighting circuit 201 is connected to the AC power source 3 via the power source terminals TP1 and TP2, and to the LED module 2 via the output terminals TL1 and TL2.

The AC power source 3 is, for example, a commercial power source. Within Japan the AC power source 3 is typically a power source having a voltage output of 100 V (hereafter, an "AC 100 V power source"). On the other hand, outside of Japan, the AC power source 3 may be a power source having a voltage output of 220 V (hereafter, an "AC 220 V power source"). Accordingly, the lighting circuit 201 may have different specifications, depending on the voltage output of the commercial power source. In the following, the lighting circuit 201 is referred to as an AC 100 V lighting circuit when having a specification supporting an AC 100 V power source, and is referred to as an AC 220 V lighting circuit when having a specification supporting an AC 220 V power source.

The LED module 2 is composed of a plurality of sets (2 sets in FIG. 8) of LEDs 21 that are connected in series. The plurality of sets of LEDs 21 are connected in parallel. Each LED 21 is lit by power supplied from the AC power source 3 via the lighting circuit 201.

The lighting circuit 201 essentially includes a rectifying and smoothing circuit 212, a transformer T201, a switching element Q201, a first voltage supply circuit 213, a second voltage supply circuit 214, a zener diode ZD201 that is a protective circuit, and a control circuit (control unit) 218.

The rectifying and smoothing circuit 212 is configured with a diode bridge DB1, an electrolytic capacitor C201 that is connected across the output ends of the diode bridge DB1, and a series circuit including a coil NF, a capacitor C212, and a resistor RP. The series circuit is connected across both ends of the electrolytic capacitor C201. The rectifying and smoothing circuit 212 outputs voltage across both ends of the capacitor C212.

One end side of the primary coil T211 of the transformer T201 is connected to the high potential side of the rectifying and smoothing circuit 212, and another end side of the primary coil T211 of the transformer T201 is connected to the drain of the switching element Q201. The primary coil T211, the switching element Q201 and the first voltage supply circuit 213, form a buck-boost converter for supplying power to the LED module 2. The secondary coil T212 is connected to the second voltage supply circuit 214. The turns ratio of the primary coil T211 to the secondary coil T212 is the same as the turns ratio of the primary coil T11 to the secondary coil T12 explained in embodiment 1.

The switching element Q201 is an N-channel MOS transistor and includes a gate G, a drain D, and a source S. The gate G is electrically connected to the control circuit 218 via a resistor R208, the drain D is connected to the primary coil T211 of the transformer T1, and the source S is connected to an output end of the low potential side of the rectifying and smoothing circuit 212 via the resistor R210. Further, a resistor R209 is connected across the source S and the gate G of the switching element Q201. Note that the resistor R208 and the resistor R209 function as gate resistors for preventing parasitic resonance, etc. Further, the resistor R210 is for limiting the flow of current to the switching element Q201 when the switching element Q201 is in the on state.

The first voltage supply circuit 213 supplies the voltage across both ends of the primary coil T211 to the LED module 2 via the power terminals TL1 and TL2. The first voltage supply circuit 213 includes a diode D205 and a electrolytic capacitor C208 that are connected in series across both ends of the primary coil T211, and a resistor R206 that is connected in parallel to the electrolytic capacitor C208. Note that the anode of the diode D205 is connected to the node between the primary coil T211 and the switching element Q201, and the cathode of the diode D205 is connected to the electrolytic capacitor C208. Each end of the electrolytic capacitor C208 is connected to either the output terminal TL1 or the output terminal TL2. Note that the pulsed voltage generated across both ends of the primary coil T211 is smoothed by the electrolytic capacitor C208 and outputted from the output terminals TL1 and TL2.

The second voltage supply circuit 214 supplies voltage induced across the secondary coil T212 to the power source terminal Vcc. The second voltage supply circuit 214 includes a series circuit that includes two resistors, R205 and R212, a capacitor NC, and a diode D206. The two resistors, R205 and R212, are connected in series across the output ends of the rectifying and smoothing circuit 212. The capacitor NC is connected between the power source terminal Vcc of the control circuit 218 and the output end of the low potential side of the rectifying and smoothing circuit 212. The anode of the diode D206 is connected to one end side of the secondary coil (voltage supply coil) T212 of the transformer T201, and the cathode of the diode D206 is connected to the power source terminal Vcc of the control circuit 218. Note that the node in the series circuit between the two resistors R205 and R212 is connected to the power source terminal Vcc of the control circuit 218. Further, the series circuit that includes the two resistors, R205 and R212, is configured to, during initial operation of the lighting circuit 201 when power is introduced, direct current from the rectifying and smoothing circuit 212 to the electrolytic capacitor NC and supply voltage to the power source terminal Vcc of the control circuit 218. Current is also supplied by this series circuit in the same way during normal operation.

The zener diode ZD201 is for preventing excess voltage from being applied to the power source terminal Vcc of the control circuit 218. The cathode of the zener diode ZD201 is connected to the power source terminal Vcc of the control circuit 218. The anode of the zener diode ZD201 is connected to another end side of the secondary coil T212 of the transformer T201, via the resistor R213. As the zener diode ZD201, an HZ11C2 zener diode manufactured by Renesas Technology Corporation may be used.

The control circuit 218 controls switching of the switching element Q201 between the on state and the off state by altering the voltage applied to the gate of the switching element Q201. The control circuit 218 includes a current detection circuit 215, an oscillation circuit 217, and a control suspending circuit 216. The current detection circuit 215 outputs an enable signal (substantially 0 V) when the current flowing through the zener diode ZD201 and the resistor R213 is less than or equal to the reference current value. The current detection circuit 215 outputs a disable signal (a voltage higher than 0 V) when the current flowing through the zener diode ZD201 and the resistor R213 is greater than the reference current value. The oscillation circuit 217 outputs a pulsed voltage. The control suspending circuit 216 causes the voltage output of the oscillation circuit 217 to be outputted from an output terminal TOUT while the enable signal is being inputted from the current detection circuit 215. The control suspending circuit 216 causes the voltage output of the oscillation circuit 217 not to be outputted from the output terminal TOUT while the disable signal is being inputted from the current detection circuit 215.

Figure 9:
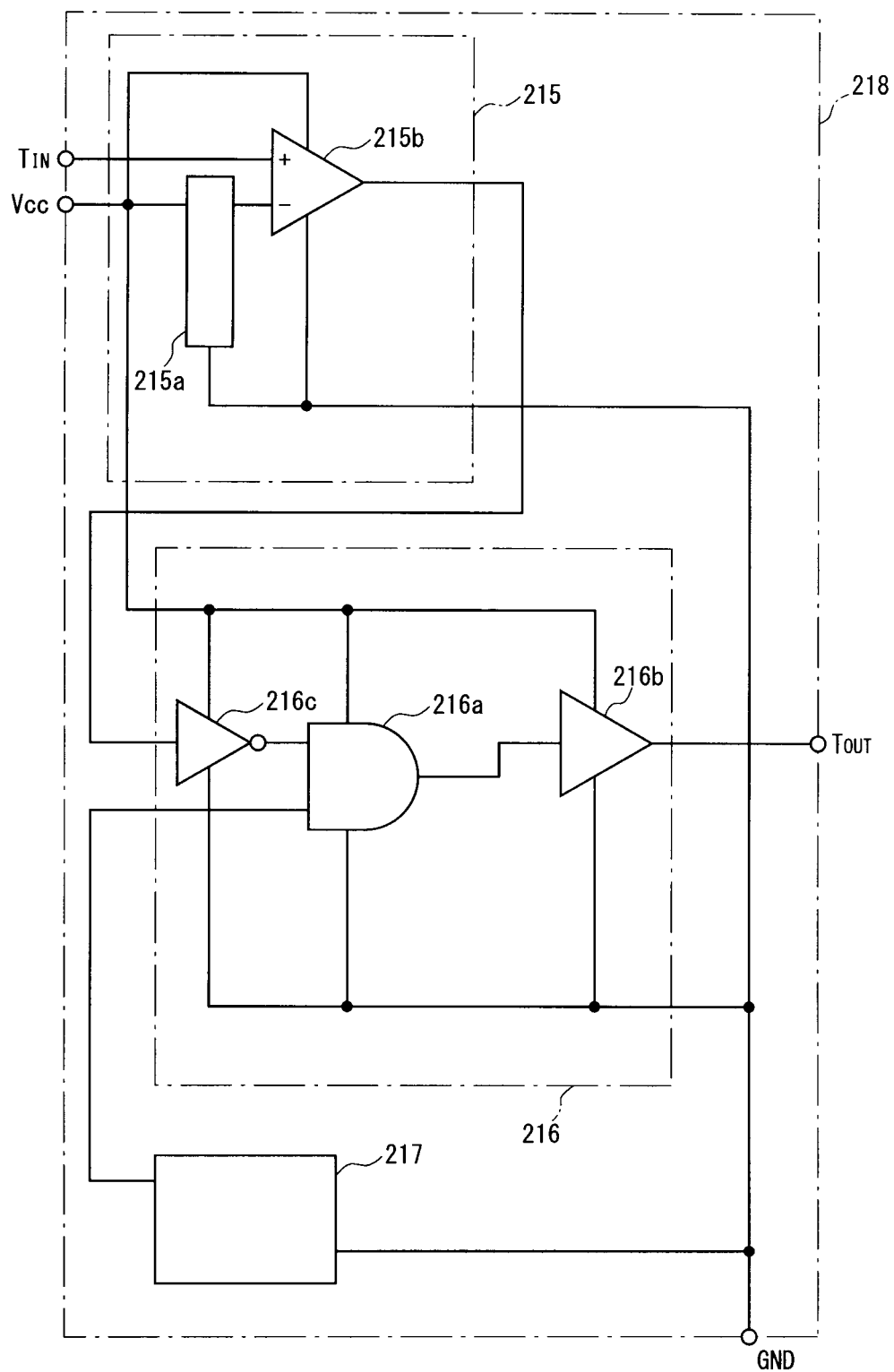
FIG. 9 is a circuit diagram of a relevant part of the lighting circuit pertaining to embodiment 2.

The control circuit 218 includes a power source terminal Vcc that receives a supply of driving voltage, the output terminal TOUT, which outputs the pulsed voltage, and a terminal GND for connecting the output end of the low voltage side of the rectifying and smoothing circuit 212. Details of the structure of the control circuit 218 are shown in FIG. 9.

The current detection circuit 215 includes a band gap regulator 215a, and an operational amplifier 215b. The band gap regulator 215a outputs a standard voltage that is lower than the voltage inputted to the power source terminal Vcc. The operational amplifier 215b compares the standard voltage and a voltage across both ends of the resistor R213 that is inputted from the input terminal TIN. When the inputted voltage is lower than the standard voltage, the operational amplifier 215b outputs a voltage that is substantially 0 V (enable signal). When the inputted voltage is higher than the standard voltage, the operational amplifier outputs a voltage of a predetermined magnitude (disable signal). The band gap regulator 215a may be configured, for example, as disclosed in FIG. 1 in Japanese Patent Application Publication No. 2000-339049. The standard voltage is greater than 0 V, and lower than the voltage generated across both ends of the resistor R213 when the current flowing through the zener diode ZD201 has reached the reference current value. For example, when a resistance of 0.1 kΩ is used as the resistor R213, if the disable signal is to be outputted when the current flowing through the zener diode ZD201 reaches 30 mA (reference current value), it suffices that a voltage of 3 V is used as the standard voltage.

This current detection circuit 215 detects a voltage generated at both ends of the resistor R213 when current flows through the zener diode ZD201 and the resistor R213. Accordingly, the current detection circuit 215 may also be considered a voltage detection circuit that detects the voltage across both ends of the resistor R213.

The oscillation circuit 217 generates a voltage to be applied to the gate of the switching element Q201 in order to switch the switching gate Q201 between the on state and the off state. The oscillation circuit 217 may, for example, be composed of a pulse-width modulation (PWM) oscillator that outputs voltage having a rectangular, pulsed waveform.

The control suspending circuit 216 is connected to an output end of the current detection circuit 215 and includes a NOT circuit 216c, an AND circuit 216a, and a buffer circuit 216b. The NOT circuit 216c inverts and outputs signals inputted from the current detection circuit 215. The AND circuit 216a is connected to an output end of the NOT circuit 216c and an output end of the oscillation circuit 217. An input end of the buffer circuit 216b is connected to an output end of the AND circuit 216a. The buffer circuit 216b amplifies voltage outputted from the AND circuit 216a and outputs the voltage to the output terminal TOUT. When the enable signal (substantially 0 V) is being inputted to the control suspending circuit 216 from the current detection circuit 215, the NOT circuit 216c alters the enable signal to a voltage greater than 0 V and outputs the altered signal (inverted output). In this case, at the input end of the AND circuit 216a that is connected to the NOT circuit 216c, a voltage greater than 0 V is constantly inputted. Further, in this case, the pulsed voltage inputted to the AND circuit 216a from the oscillation circuit 217 is inputted unaltered to the buffer circuit 216b from the AND circuit 216a. On the other hand, when the disable signal (a voltage greater than 0 V) is being inputted to the control suspending circuit 216 from the current detection circuit, the NOT circuit 216c alters the disable signal to a voltage that is substantially 0 V and outputs the altered signal. In this case, at the input end of the AND circuit 216a that is connected to the NOT circuit 216c, a voltage that is substantially 0 V is constantly inputted. In this case, regardless of the voltage inputted to the AND circuit 216a from the oscillation circuit 217, a voltage that is substantially 0 V is inputted to the buffer circuit 216b from the AND circuit 216a. According to the above, the control suspending circuit 216 outputs a voltage outputted from the oscillation circuit 217 as a pulsed voltage when the enable signal is inputted from the current detection circuit 215. On the other hand, the control suspending circuit 216 outputs a voltage that is substantially 0 V when the disable signal is inputted from the current detection circuit 215.

Note that in actual implementation, the current detection circuit 215, the oscillation circuit 217, and the control suspending circuit 216, which are included in the control circuit 218, are included in a single integrated circuit (IC) package. Alternatively, the circuits included in the control circuit 218 and the switching element Q201 may be included in a single IC package.

<Operations>

The following is an explanation of the operations of the lighting circuit 201 pertaining to the present embodiment. Note that in the following explanation, a "same polarity transformer T201" is a transformer in which, when current flows through the primary coil T211, current also flows through the secondary coil T212. Also, a "different polarity transformer T201" is a transformer in which, when current flows through the primary coil T211, current does not flow through the secondary coil T212 due to the effect of the diode D206. However, depending on the circuit connected to the transformer T201, even in cases where the transformer T201 has the same polarity, the structure of the transformer T201 (winding direction, winding position) may vary.

The behavior of the lighting circuit 201 differs depending on whether the polarity of the primary coil T211 and the secondary coil T212 in the transformer 201 is the same or different. The following explanation of the operations of the lighting circuit 201 is separated into two cases, one in which the polarity of the primary coil T211 and the secondary coil T212 in the transformer 201 is the same, and the other in which the polarity of the primary coil T211 and the secondary coil T212 in the transformer 201 is different.

<2-1> Case Where Polarity of Primary Coil T211 and Secondary Coil T212 of Transformer T201 is the Same <2-1-1> Standard Operations FIG. 10, part (a) illustrates timings at which the switching element switches on and off. FIG. 10, part (b) illustrates changes in current flowing through the primary coil T211 (current through the drain of the switching element Q201) over time. FIG. 10, part (c) illustrates changes in potential at the node between the drain of the switching element Q201 and the primary coil T211 over time. FIG. 10, part (d) illustrates changes in current flowing through the secondary coil T212 over time. In FIG. 10, parts (b), (c), and (d), the dashed-dotted line illustrates the use of an AC 100 V power source as the AC power source 3, and the solid line illustrates the use of an AC 220 V power source as the AC power source 3.

First, after time T1, when the switching element Q201 switches to the on state (refer to FIG. 10, part a), a current Id flowing through the primary coil T211 gradually increases (refer to FIG. 10, part b). Here, since the switching element Q201 is in the on state, the drain side of the switching element Q201 (the node between the switching element Q201 and the primary coil T211) maintains a voltage that is substantially the same as the voltage (substantially 0 V) at the output end of the low potential side of the rectifying and smoothing circuit 212 (refer to FIG. 10, part c).

Also, a voltage is generated across the secondary coil T212 where the one end side of the secondary coil T212 that is connected to the diode D206 has a higher potential than the other end side of the secondary coil T212. Therefore, the current I2 flows from the secondary coil T212 to the diode D206 (refer to FIG. 10, part d). Thus, the capacitor NC, which is connected between the power source terminal Vcc of the controller circuit 218 and the output end of the low potential side of the rectifying and smoothing circuit 212, is charged, and power is supplied to the power source terminal Vcc.

Next, after time T2, the current Id flowing through the secondary coil T212 gradually decreases (refer to FIG. 10, part d).

Next, after time T3, when the switching element Q201 switches to the off state (refer to FIG. 10, part a), the current Id flowing through the primary coil T211 gradually decreases (refer to FIG. 10, part b). Also, from the moment the switching element Q201 switched to the off state, the current Id that had flowed through the primary coil T211 flows into the capacitor C208 via the diode D205. Thus, the capacitor C208 is charged, and a voltage Vd at the drain side of the switching element Q201 increases (refer to FIG. 10, part c).

At time T3, the voltage Vd at the drain side of the switching element Q201, reaches Vd1 (refer to FIG. 10, part c). Between time T3 and time T4, a voltage is generated across the secondary coil T212 where the one end side of the secondary coil T212 that is connected to the diode D206 has a lower potential than the other end side of the secondary coil T12. Therefore, the diode D206 does not conduct and current does not flow through the secondary coil T212 (refer to FIG. 10, part d). Also, between time T3 and time T4, a voltage is generated across the output terminal TL1 and the output terminal TL2 of the lighting circuit 201 since the output terminal TL1 has a higher potential than the output terminal TL2.

Next, after time T4, the voltage Vd at the drain side of the switching element Q201 fluctuates, reflecting a resonance generated across the primary coil T211 and a parasitic capacitance of the switching element Q201.

Finally, after time T5, when the switching element Q201 again switches to the on state (refer to FIG. 10, part a), the current flowing through the primary coil T211 gradually increases, and the current I2 flowing through the secondary coil T212 gradually increases (refer to FIG. 10, parts b and d).

Note that, in a case where the polarity of the primary coil T211 and the secondary coil T212 of the transformer T201 is the same, as shown in FIG. 10, parts (b) and (d), the level of the current I2 flowing through the secondary coil T212 is substantially in proportion to the level of the current Id flowing through the primary coil T211 (a drain current of the switching element Q201) when the switching element is in the on state. Specifically, the level of a current I21 flowing through the secondary coil T212 when the AC power source 3 is an AC 220 V power source is approximately 2.2 times greater than the level of a current I20 flowing through the secondary coil T212 when the AC power source 3 is an AC 100 V power source. Here, a voltage generated across both ends of the secondary coil T212 is also approximately 2.2 times greater. However, the maximum value of the current I21 may not change in some cases, depending on a method of control of the switching element Q201 by the control circuit 218.

<2-1-2> Operations of AC 100 V Lighting Circuit 201 When Connected to AC 220 V Power Source The following is an explanation of the operations of the AC 100 V lighting circuit 201 when the AC power source 3 is an AC 220 V power source, compared with the AC 100 V lighting circuit 201 when the AC power source 3 is an AC 100 V power source.

<Case Where AC Power Source 3 is AC 100 V Power Source>

Figure 11A:
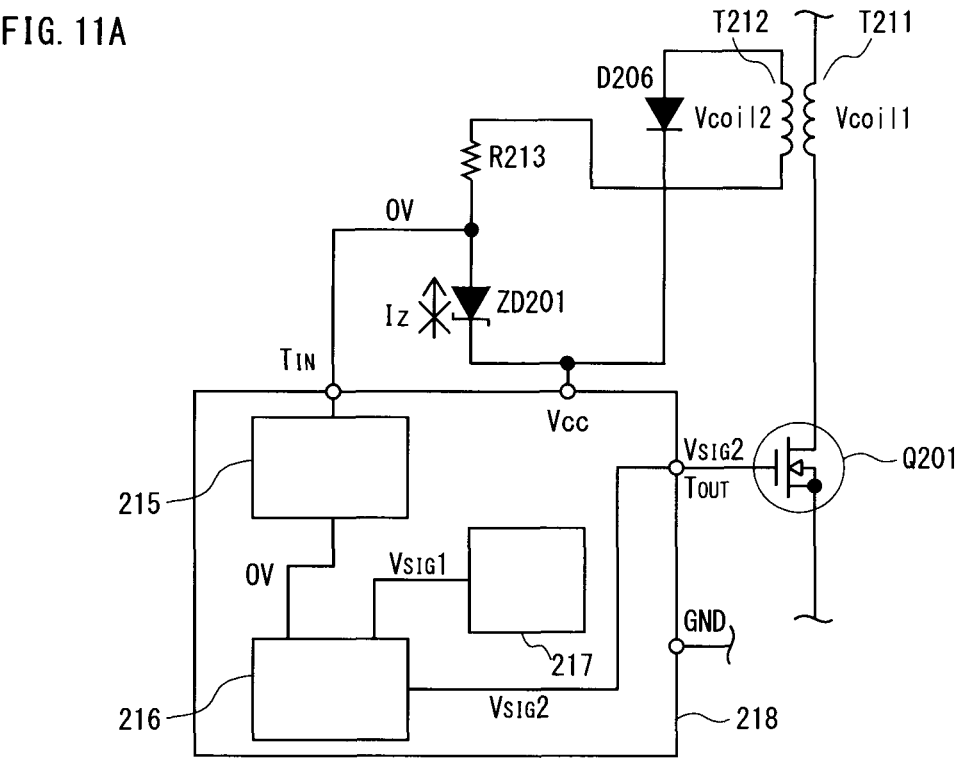
FIG. 11A is a diagram for explaining operations of the lighting circuit pertaining to embodiment 2.

An explanation is provided of operations in which the AC power source 3 is an AC 100 V power source, based on FIG. 11A.

When the switching element Q201 is in the on state, the current I22 flows through the secondary coil T212 (FIG. 12, part d, dashed-dotted line). Therefore, a voltage Vcoil2, which is generated across both ends of the secondary coil T212, is applied across both ends of a series circuit including the zener diode ZD201 and the resistor R213. The greatest value of the voltage Vcoil2, across both ends of this series circuit, is less than a breakdown voltage of the zener diode ZD201 (the voltage at which current is able to flow through the zener diode ZD201), and therefore a current Iz does not flow through the zener diode ZD201. Accordingly, a voltage across both ends of the resistor R213 is substantially 0 V, and a voltage inputted to the input terminal TIN is substantially 0 V.

Since the voltage inputted to the input terminal TIN is lower than the standard voltage, the current detection circuit 215 outputs a voltage of substantially 0 V (the enable signal), which is inputted to the control suspending circuit 216. A pulsed voltage VSIG1 is also inputted to the control suspending circuit 216 from the oscillation circuit 217. Accordingly, the control suspending circuit 216 amplifies the pulsed voltage VSIG1, which is inputted from the oscillation circuit 217, and outputs the amplified voltage VSIG2 to the output terminal TOUT. Thus, the voltage VSIG2 is applied to the gate of the switching element Q201.

<Case Where AC Power Source 3 is AC 220 V Power Source>

Figure 11B:
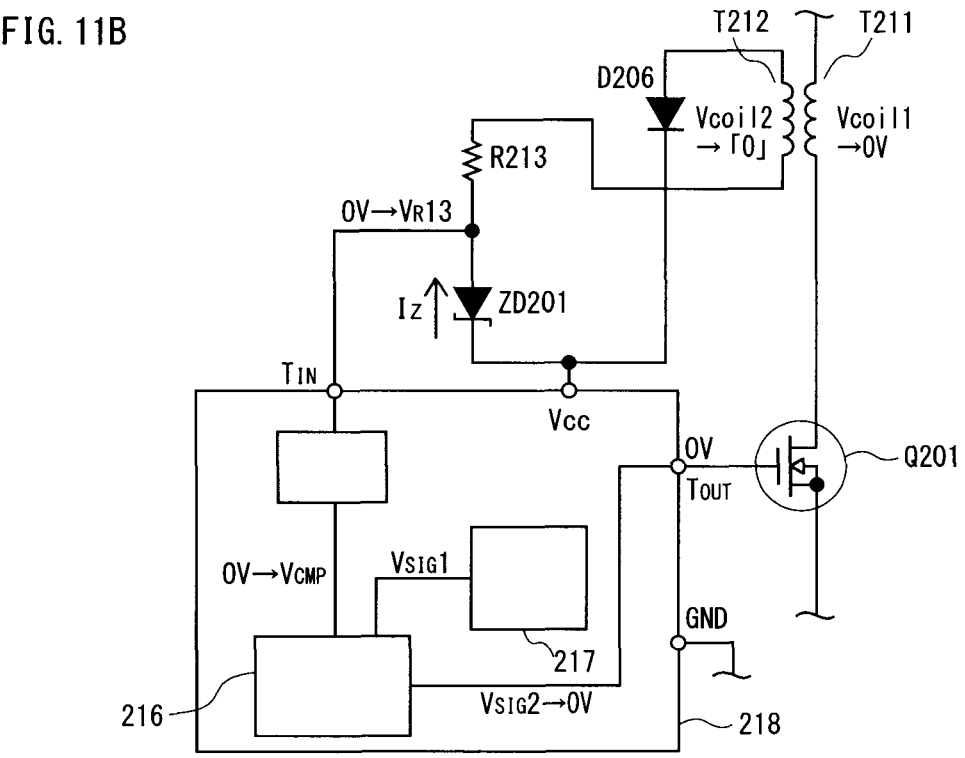
FIG. 11B is a diagram for explaining operations of the lighting circuit pertaining to embodiment 2.

An explanation is provided of operations in which the AC power source 3 is an AC 220 V power source, based on FIG. 11B.

When the switching element Q201 is in the on state, the current I2 flows through the secondary coil T212 (FIG. 10, part d, dashed-dotted line). The voltage Vcoil2, which is generated across both ends of the secondary coil T212, is applied across both ends of the series circuit including the zener diode ZD201 and the resistor R213. Here, the greatest value I21 of the current I2 flowing through the secondary coil T212 is approximately 2.2 times greater than the greatest value I20 of the current I2 flowing through the secondary coil T212 when the AC power source 3 is an AC 100 V power source. Accordingly, the greatest value of the voltage Vcoil2, applied across both ends of the series circuit, is also approximately 2.2 times greater than the greatest value of the voltage Vcoil when the AC power source 3 is an AC 100 V power source. However, the maximum value of the current I21 may not change in some cases, depending on a method of control of the switching element Q201 by the control circuit 218.

Here, when the voltage Vcoil2 exceeds the breakdown voltage of the zener diode ZD201, current flows through the zener diode ZD201. Thus, the voltage Vcoil increases, and when a zener current flowing through the zener diode ZD201 reaches the reference current value (for example, 30 mA), the voltage across both ends of the resistor R213 changes from substantially 0 V to a voltage VR13, which is higher than 0 V. Thus, the voltage at the input terminal TIN becomes the voltage VR13.

When the voltage inputted to the current detection circuit 215 from the input terminal TIN is higher than the standard voltage, a voltage VCMP (disable signal) that is higher than 0 V is outputted to the control suspending circuit 216 from the current detection circuit 215. The pulsed voltage VSIG1 is also inputted to the control suspending circuit 216 from the oscillation circuit 217. Accordingly, an output voltage of the control suspending circuit 216 becomes substantially 0 V, and a voltage applied to the gate of the switching element Q201 is maintained at substantially 0 V.

Thus, since the switching element Q201 is maintained in the off state, current stops flowing through the primary coil T211 and the voltage Vcoil1 across both ends of the primary coil T211 becomes substantially 0 V. Accordingly, the voltage Vcoil2 across both ends of the secondary coil T212 becomes substantially 0 V, causing the voltage supply to the power source terminal Vcc of the control circuit 218 to cease, and the zener current to stop flowing through the zener diode ZD201.

<2-1-3> Operations When Level of Resistance Across Output Terminals TL1 and TL2 of Lighting Circuit 201 is Greater Due to Reasons Such as Poor Connection with LED Module 2

In a case where the polarity of the primary coil T211 and the secondary coil T212 of the transformer 201 is the same, regardless of the level of resistance across the output terminals TL1 and TL2 of the lighting circuit 201, the greatest value of the voltage Vcoil2 generated across both ends of the secondary coil T212 does not change. Accordingly, even when power is supplied from the AC power source 3 while there is a poor connection between the LED module 2 and the lighting circuit 201, as long as the AC power source 3 is an AC 100 V power source, destruction of the zener diode ZD201 does not take place.

In the present embodiment the lighting circuit 201 may include a transformer T201 in which the polarity of the primary coil 211 and the secondary coil 212 is the same. In such a case, as described above, even when the AC 100 V lighting circuit 201 is connected to a power source with an output voltage greater than 100 V (for example, an AC 220 V power source), power supply to the control circuit 218 is cut off, suspending the functions of the control circuit 218 before excess current flows through the zener diode ZD201. Thus, destruction of the zener diode ZD201 can be prevented.

In particular, destruction of the zener diode ZD201 can be prevented even when an operator mistakenly connects the AC 100 V lighting circuit 201 to an AC 220 V power source in an operational test prior to shipping a lamp containing the lighting circuit 201. Accordingly, the burden of replacing a zener diode ZD201 destroyed in an operational test prior to shipping can be eliminated.

Also, as well as preventing destruction of the zener diode ZD201, by performing the above-described excess voltage operations, overheating of the lighting circuit 201 and accompanying smoke emission, and electric shock to an operator carrying out an operational test on the lighting circuit 201 are prevented.

<2-2> Case where Polarity of Primary Coil T11 and Secondary Coil T12 of Transformer T1 is Different
<2-2-1> Standard Operations FIG. 12, part (a) illustrates timings at which the switching element switches on and off. FIG. 12, part (b) illustrates changes in current flowing through the primary coil T211 (the drain current of the switching element Q201) over time. FIG. 12, part (c) illustrates changes in potential at the node between the drain of the switching element Q201 and the primary coil T211 over time. FIG. 12, part (d) illustrates changes in current flowing through the secondary coil T212 over time. In FIG. 12, parts (b) through (d), the dashed-dotted lines illustrate a case in which the LED module 2 is connected normally, and the solid line illustrates cases in which the level of resistance across the output terminals TL1 and TL2 is increased due to a poor connection with the LED module 2.

First, after time T1, when the switching element Q201 switches to the on state (refer to FIG. 12, part a), the current Id flowing through the primary coil T211 gradually increases (refer to FIG. 12, part b). Here, since the switching element Q201 is in the on state, the drain side of the switching element Q201 (the node between the switching element Q201 and the primary coil T211) maintains a voltage that is substantially the same as the voltage (substantially 0 V) at the output end of the low potential side of the rectifying and smoothing circuit 212 (refer to FIG. 12, part c).

Also, a voltage is generated across the secondary coil T212 where the one end side of the secondary coil T212 that is connected to the diode D206 has a lower potential than the other end side of the secondary coil T212. Therefore, the diode D206 does not conduct and the current I2 does not flow through the secondary coil T212 (refer to FIG. 12, part d). Next, after time T2, when the switching element Q201 switches to the off state (refer to FIG. 12, part a), the current Id flowing through the primary coil T211 gradually decreases (refer to FIG. 12, part b). Also, from the moment the switching element Q201 switches to the off state, the current Id that flowed through the primary coil T211 flows into the capacitor C208 via the diode D205. Thus, the capacitor C208 is charged, and the voltage Vd at the drain side of the switching element Q201 (at a node between the primary coil T211 and the switching element Q201) increases (refer to FIG. 12, part c). Meanwhile, in proportion to the voltage Vd at the drain side of the switching element Q201, a voltage is generated across the secondary coil T212 where the one end side of the secondary coil T212 that is connected to the diode D206 has a higher potential than the other end side of the secondary coil T212, and therefore the diode D206 conducts and current flows through the secondary coil T212.

Also, at time T2, the voltage Vd at the drain side of the switching element Q201 reaches a voltage Vd (refer to FIG. 12, part c). This voltage Vd is dependent on the level of the resistance connected between the output terminals TL1 and TL2. Here, the resistance connected between the output terminals TL1 and TL2 means not only the resistance of a resistor, but may also mean the resistance of a semiconductor load such as a light-emitting diode. As such, the voltage Vd increases in proportion to an increase in the voltage across the output terminals TL1 and TL2 (a rated voltage Vf of the LED module 2). Between time T2 and time T4, a voltage is generated across the secondary coil T212 where the one end side of the secondary coil T212 that is connected to the diode D206 has a higher potential than the other end side of the secondary coil T212, and therefore the diode D206 conducts and current flows through the secondary coil T212. However, when there is a poor connection with the LED module 2 (an open failure of the LED module 2), the voltage Vd fluctuates like a wave, as shown by the solid line in FIG. 12, part c. This current I2, flowing through the secondary coil, is greatest at time T3 (refer to FIG. 12, part d). Also, between time T2 and time T4, a voltage is generated across the output terminal TL1 and the output terminal TL2 of the lighting circuit 201 since the output terminal TL1 has a higher potential than the output terminal TL2.

Then, at time T4, the drain potential of the switching element Q201 fluctuates, reflecting a resonance generated across the primary coil T211 and a parasitic capacitance of the switching element Q201.

Finally, after time T5, when the switching element Q201 again switches to the on state (refer to FIG. 12, part a), the current flowing through the primary coil T211 gradually increases (refer to FIG. 12, part b).

Note that, in a case where the polarity of the primary coil T211 and the secondary coil T212 of the transformer T201 is different, the level of the current I2 flowing through the secondary coil T212 is dependent on the voltage applied to an input terminal of the light-emitting module 2 from the output terminals TL1 and TL2 (in other words, the rated voltage Vf of the LED module 2). Accordingly, when the voltage applied to an input terminal of the light-emitting module 2 from the output terminals TL1 and TL2 increases, the current I2 flowing through the secondary coil T212 also increases from a current I22 to a current I23, and the voltage generated across both ends of the secondary coil T212 also increases.

<2-2-2> Operations of AC 100 V Lighting Circuit 201 When Connected to AC 220 V Power Source Regardless of whether the AC power source 3 is an AC 100 V power source or an AC 220 V power source, the voltage across both ends of the secondary coil T212 is not altered, and the level of the current I2 flowing through the secondary coil T212 is not altered. Accordingly, a voltage of substantially 0 V (the enable signal) is inputted to the control suspending circuit 216 from the current detection circuit 215. The pulsed voltage VSIG1 is also inputted to the control suspending circuit 216 from the oscillation circuit 217. Then, the control suspending circuit 216 amplifies the pulsed voltage VSIG1, which is inputted from the oscillation circuit 217, and outputs the amplified voltage as a voltage VSIG2 to the output terminal TOUT. Thus, the voltage VSIG2 is applied to the gate of the switching element Q201. However, the voltage generated at the node between the resistor R205 and the resistor R212 is also supplied to the power source terminal Vcc of the control circuit 218. In other words, voltage is supplied to the power source terminal Vcc from the AC power source 3 via the resistor R205. Thus, by selecting a suitable constant for the resistor R213 and the zener diode ZD201, fluctuations in voltage supplied to the power source terminal Vcc can be detected.

Accordingly, even in a case where the polarity of the primary coil T211 and the secondary coil T212 in the transformer is different, the lighting circuit 201 can be configured to cease applying a voltage to the gate of the switching element Q201 when the AC power source 3 is an AC 220V power source. This can be realized by selecting a suitable constant for the resistor R213 and the zener diode ZD201 and thereby detecting whether or not a suitable power source is being used as the AC power source 3 (i.e. whether the AC power source 3 is an AC 100 V power source or an AC 220 V power source).

<2-2-3> Operations When Level of Resistance Across Output Terminals TL1 and TL2 of Lighting Circuit 201 is Greater Due to Such Reasons as Poor Connection with LED Module 2

The following is an explanation of operations in a case where the level of resistance across the output terminals TL1 and TL2 of the lighting circuit 201 is greater due to reasons such as a poor connection with the LED module 2, compared with operations in which the LED module 2 is normally connected.

<Case Where LED Module 2 is Normally Connected>

The following is an explanation of operations in a case where the LED module 2 is normally connected to the output terminals TL1 and TL2 of the lighting circuit 201, based on FIG. 11A. Note that explanations of operations that are in common with the operations explained under the heading <2-1-2> have been omitted.

When the switching element Q201 is in the off state, current I2 flows through the secondary coil T212 (refer to the dashed-dotted line in FIG. 12, part d). The voltage Vcoil2 that occurs across both ends of the secondary coil T212 is applied across both ends of the series circuit that includes the zener diode ZD201 and the resistor R213. Since the greatest value of the voltage Vcoil2, across both ends of the series circuit, is less than the breakdown voltage of the zener diode ZD201 (the voltage at which current can flow through the zener diode ZD201), the current Iz does not flow through the zener diode ZD201. Accordingly, the voltage across both ends of the resistor R213 becomes substantially 0 V, and the voltage at the input terminal TIN becomes substantially 0 V. Here, a voltage of substantially 0 V (enable signal), is inputted to the control suspending circuit 216 from the voltage detection circuit 215. Thus, the voltage VSIG2 is applied to the gate of the switching element Q201. Explanation of the details of the operations of the current detection circuit 215, the control suspending circuit 216, and the oscillation control circuit 217 have been omitted, since the operations are the same as those explained under the heading <2-1-2>.

<Poor Connection with LED Module 2>

The following is an explanation of operations in a case where the LED module 2 is not normally connected to the output terminals TL1 and TL2 of the lighting circuit 201, i.e. when there is a poor connection with the LED module 2. Note that explanations of operations that are in common with the operations explained under the heading <2-1-2> have been omitted.

When the switching element Q201 is in the off state, the current I2 flows through the secondary coil T212 (refer to FIG. 12, part d), and the voltage Vcoil2 that occurs across both ends of the secondary coil T212 is applied to both ends of the series circuit that includes the zener diode ZD201 and the resistor R213. The greatest value I23 of the current I2 flowing through the secondary coil T212 is greater than the greatest value I22 of the current I2 flowing through the secondary coil T212 when the LED module 2 is normally connected. This is due to current not flowing between the output terminals TL1 and TL2 when there is a poor connection with the LED module 2, causing the voltage value to become higher. Thus, the greatest value of the voltage at the drain side of the switching element Q201, when the switching element Q201 is in the off state, becomes proportionately greater (refer to FIG. 12, part c). Accordingly, the greatest value of the voltage Vcoil2, applied across both ends of the series circuit, is also greater, compared to the greatest value of the voltage Vcoil that occurs when the LED module 2 is normally connected.

Thus, when the voltage Vcoil2 exceeds the breakdown voltage of the zener diode ZD201, current flows through the zener diode ZD201. Thus, the voltage Vcoil increases, and when the zener current flowing through the zener diode ZD201 reaches the reference current value (for example, 30 mA), the voltage across both ends of the resistor R213 changes from substantially 0 V to the voltage VR13, which is higher than 0 V. Thus, the voltage at the input terminal TIN becomes the voltage VR13. At this time, the voltage VCMP, which is greater than 0 V (disable signal), is inputted to the control suspending circuit 216 from the voltage detection circuit 215. Thus, a voltage outputted from the control suspending circuit 216, via the output terminal TOUT of the control circuit 218, becomes substantially 0 V, and the switching element Q201 is maintained in the off state.

Thus, current can no longer flow through the primary coil T211, and the current Vcoil1 across both ends of the primary coil T211 becomes substantially 0 V. Accordingly, the voltage Vcoil2 across both ends of the secondary coil T212 becomes substantially 0 V, causing the voltage supply to the power source terminal Vcc of the control circuit 218 to cease, and the current Iz to stop flowing through the zener diode ZD201. Explanation of the operations of the current detection circuit 215, the control suspending circuit 216, and the oscillation control circuit 217 have been omitted, since the operations are the same as those explained under the heading <2-1-2>.

As described above in the present embodiment, when the AC 100 V lighting circuit 201 is connected to a power source with an output voltage greater than 100 V (for example, an AC 220 V power source), the lighting circuit 201 in which the polarity of the primary coil T211 and the secondary coil T212 of the transformer T201 is different functions the same way as the lighting circuit 201 in which the polarity of the primary coil T211 and the secondary coil T212 of the transformer is the same. That is, power supply to the control circuit 218 is cut off, suspending functions of the control circuit 218 before excess current flows through the zener diode ZD201. In this way, even when a power source with an output voltage greater than 100 V is connected to the AC 100 V lighting circuit 201, destruction of the zener diode ZD201 can be prevented.

Considering the lighting circuit 201 in which the polarity of the primary coil T211 and the secondary coil T212 of the transformer T201 is different, even when power is supplied from the AC power source 3 while there is a poor connection between the LED module 2 and the lighting circuit 201, destruction of the zener diode ZD201 and the control circuit 218 can be prevented. This is due to power supply to the control circuit 218 being cut off and the functions of the control circuit 218 being suspended before an excess current that exceeds a tolerance range of the zener diode ZD201 flows therethrough.

In particular, destruction of the zener diode ZD201 and the control circuit 218 can be prevented even when an operator is unable to successfully connect the lighting circuit 201 to the LED module 2, then supplies power from the AC power source 3 to the lighting circuit 201 in an operational test prior to shipping a lamp containing the lighting circuit 201. Accordingly, the burden of replacing a zener diode ZD201 or control circuit 218 destroyed in an operational test prior to shipping can be eliminated. This invention is of practical use in terms of aftermarket maintenance (especially, replacement, etc. of LED modules) of the lighting circuit 201.

<Embodiment 3>

Figure 13:
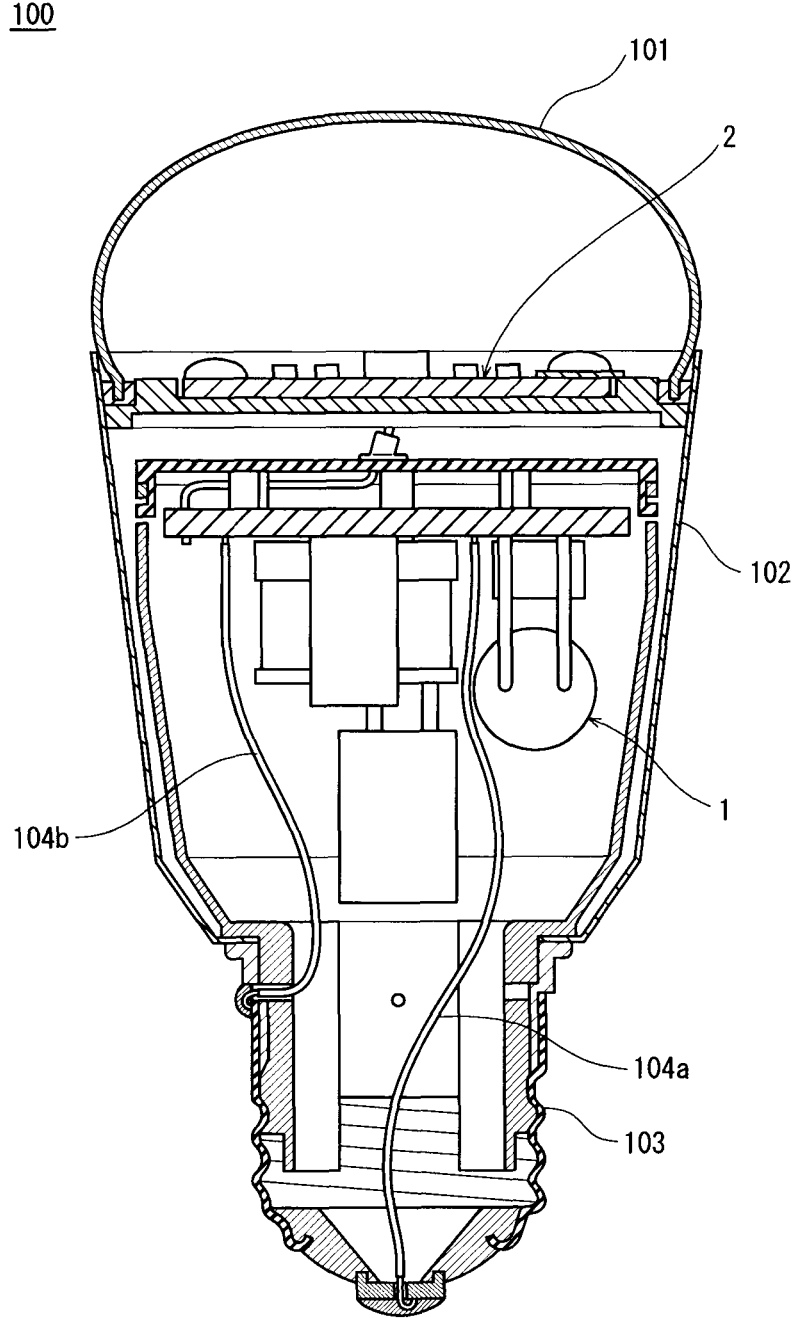
FIG. 13 is a schematic cross-sectional diagram of a lamp pertaining to embodiment 3.

An LED lamp 100 pertaining to the present embodiment is a light-bulb form LED lamp. As shown in FIG. 13, the LED lamp 100 includes the lighting circuit 1 and the LED module 2 pertaining to embodiment 1, a globe 101, a casing 102, and a base 103.

The lighting circuit 1 is contained within the casing 102, and receives power supply from an AC power source (not depicted) via the base 103 and wire leads 104a and 104b. After rectifying and smoothing the power supplied by the AC power source 3, the lighting circuit 1 steps-up or steps-down the power and supplies the power to the LED module 2.

<Modifications>

Figure 14:
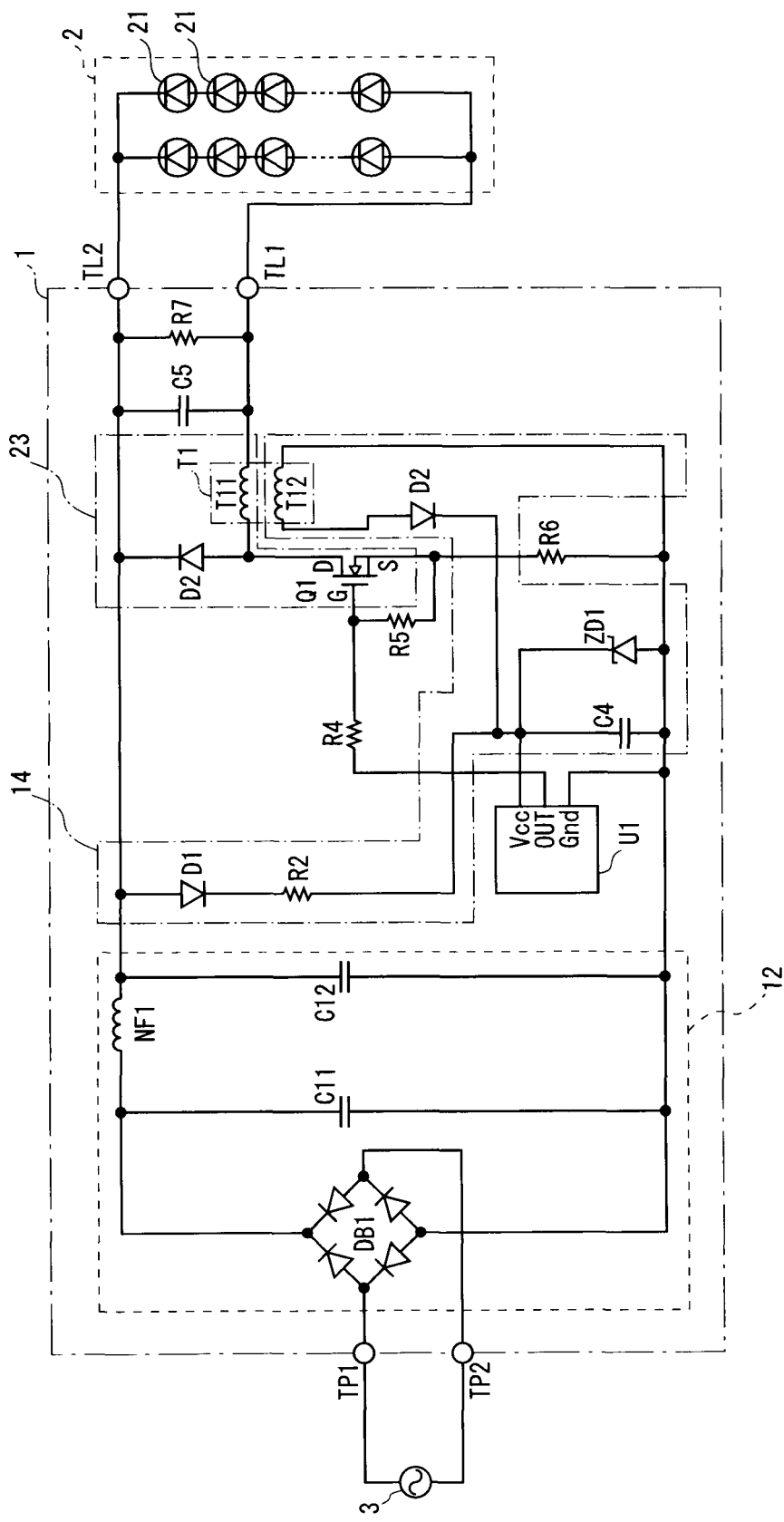
FIG. 14 is a circuit diagram of a lighting circuit pertaining to a modification.

(1) In the above-mentioned embodiments, explanation is given of examples including a buck-boost DC to DC converter, but the present invention is not limited in this way. For example, as shown in FIG. 14, a step-down DC to DC converter 23 may be included as the DC to DC converter.

The DC to DC converter 23 includes the diode D2, and the primary coil T11 of the transformer T1. One end side of the diode D2 is connected to the output end of the high potential side of the rectifying and smoothing circuit 12, and another end side of the diode D2 is connected to the switching element Q1. One end side of the primary coil T11 is connected to the node between the diode D2 and the drain of the switching element Q1. Another end side of the primary coil T11 and the one end side of the diode D2 are connected to the output terminals TL1 and TL2, respectively, via a parallel circuit that includes the capacitor C5 and the resistor R7.

Alternatively, the DC to DC converter may be a step-up or isolated, flyback or forward DC to DC converter.

(2) In the above-mentioned embodiment 1 and in the modification in (1), explanation is given of examples including the diode D1, but the diode D1 need not be included.

(3) In the above-mentioned embodiment 1 and in the modification in (2), explanation is given of examples including the zener diode ZD1, which is for preventing excessive voltage being applied to the power source terminal Vcc of the controller integrated circuit U1 and for protecting the controller integrated circuit U1. If however, it can be ensured that excessive voltage is not be applied to the power source terminal Vcc, the zener diode ZD1 need not be included.

(4) In the lighting circuit pertaining to the above-mentioned embodiments and the modification in (2), the switching frequency corresponding to the critical mode changes depending on the number of turns of the primary coil T11 and the size of the load, including the LED module 2. However, the lighting circuit does not necessarily have to operate at the switching frequency corresponding to the critical mode, and may operate at switching frequencies somewhat different from the switching frequency of the critical mode.

Figure 15:
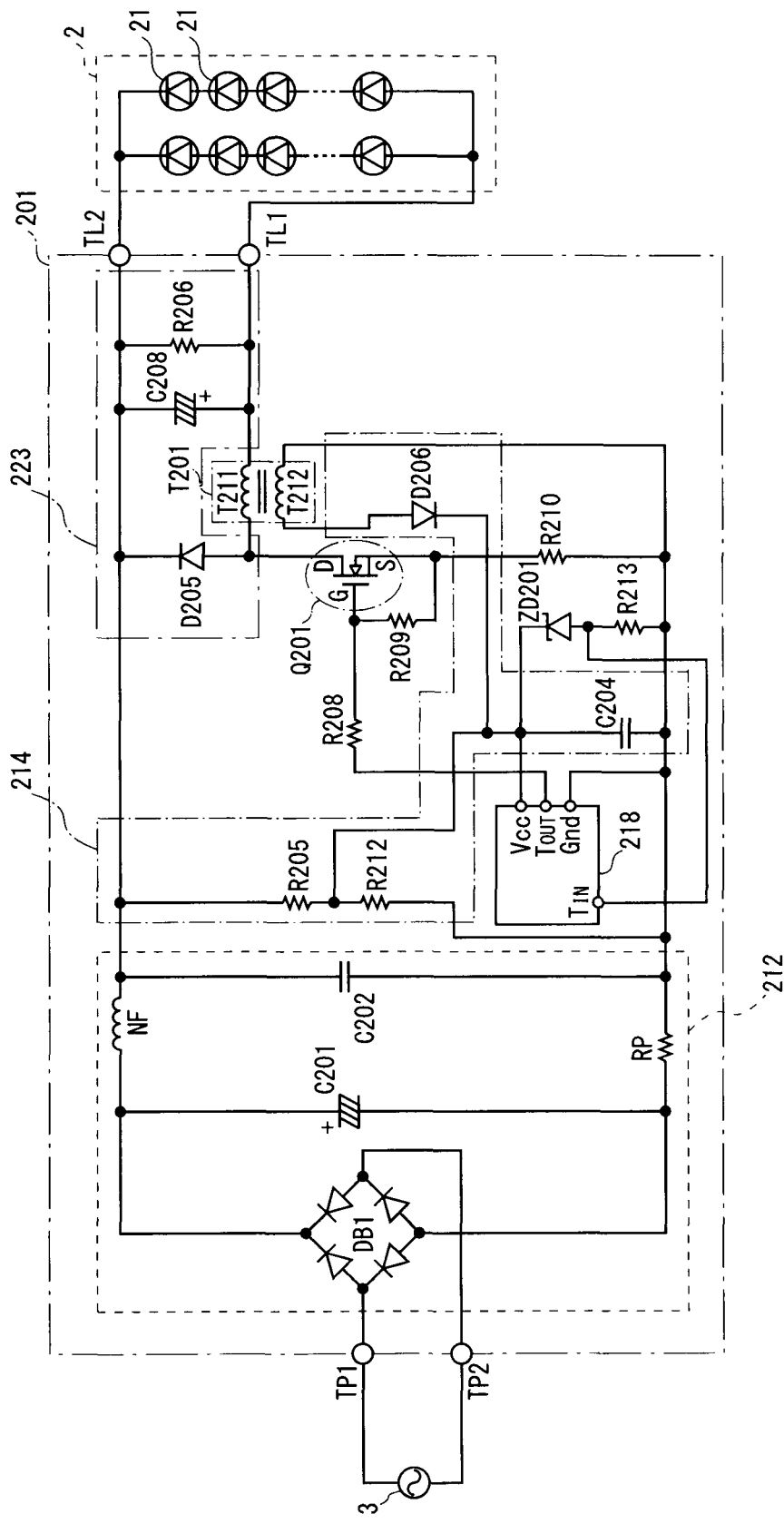
FIG. 15 is a circuit diagram of a lighting circuit pertaining to a modification.

(5) In embodiment 2, explanation is given of an example where a buck-boost DC to DC converter with a low-side control system is formed by a portion of the first voltage supply circuit 213 and the switching element Q201, but the present invention is not limited in this way. For example, as shown in FIG. 15, a step-down DC to DC converter with a low-side control system may be formed by a portion of a first voltage supply circuit 223 and the switching element Q201.

The first voltage supply circuit 223 includes the diode D205, the primary coil T211, and a parallel circuit composed of the electrolytic converter C208 and the resistor R206. The cathode of the diode D205 is connected to the output end of the high potential side of the rectifying and smoothing circuit 212, and the anode of the diode D205 is connected to the drain of the switching element Q201. One end side of the primary coil T211 of the transformer T201 is connected to a node between the diode D205 and the drain of the switching element Q201. The parallel circuit including the electrolytic converter C208 and the resistor R206 is connected across another end side of the primary coil T211 and the cathode of the diode D205.

Figure 16:
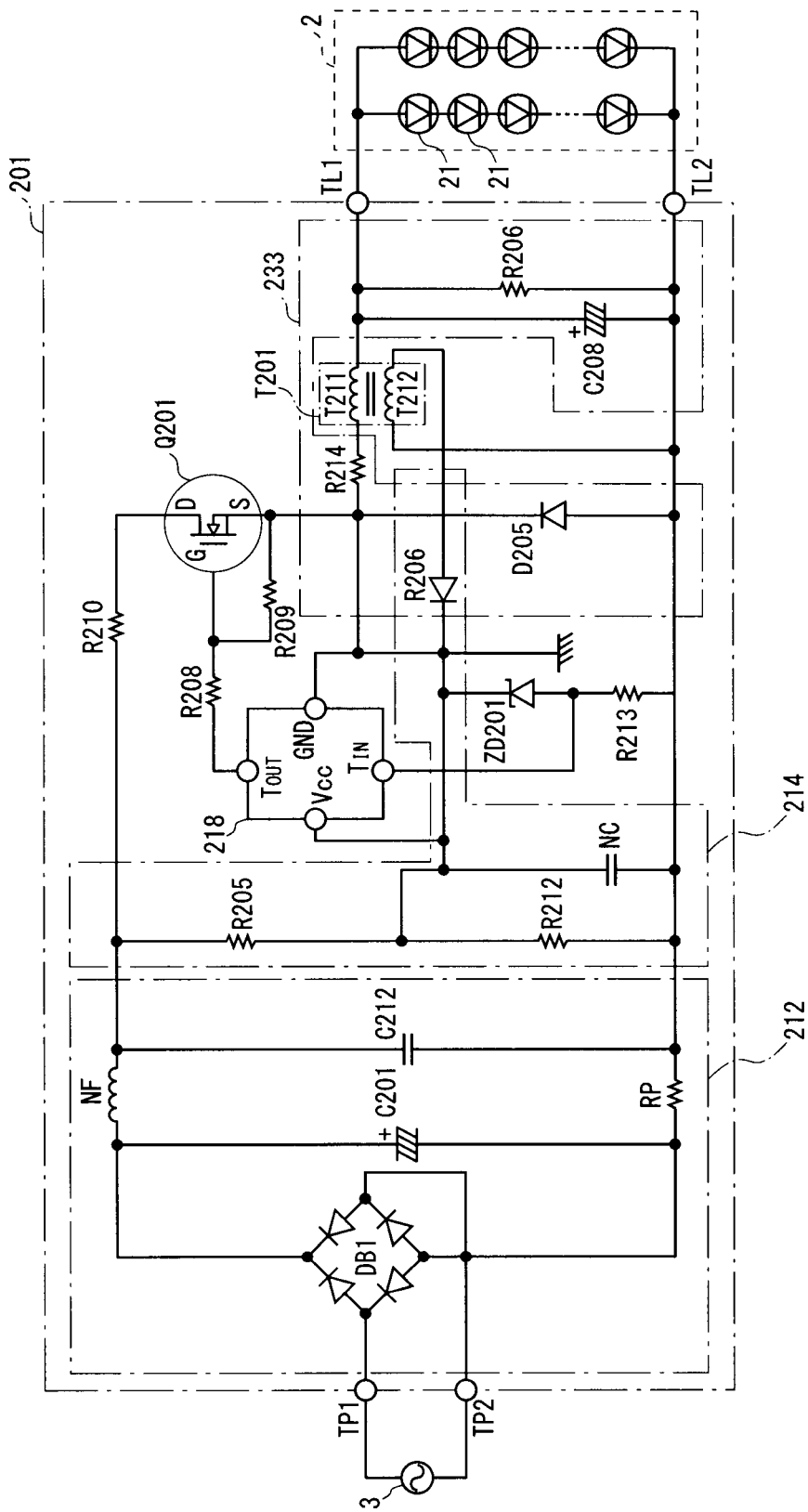
FIG. 16 is a circuit diagram of a lighting circuit pertaining to a modification.

Alternatively, as shown in FIG. 16, a step-down DC to DC converter with a high-side control system may be formed by a portion of a first voltage supply circuit 233 and the switching element Q201.

The first voltage supply circuit 233 includes the diode D205, the primary coil T211, and a parallel circuit composed of the electrolytic converter C208 and the resistor R206. The cathode of the diode D205 is connected to a ground potential, and the anode of the diode D205 is connected to the low potential side of the rectifying and smoothing circuit 212. One end side of the primary coil T211 of the transformer T201 is connected to a node between the diode D205 and the drain of the switching element Q201 via a resistor R214. The parallel circuit including the electrolytic converter C208 and the resistor R206 is connected across another end side of the primary coil T211 and the anode of the diode D205.

Compared to the configuration shown in FIG. 8, the configuration shown in FIG. 16 reduces the voltage at the drain side of the switching element Q201, while maintaining the power outputted from the output terminals TL1 and TL2 at the same level.

Also, the lighting circuit 201 may include a DC to DC converter that is a step-up or isolated, flyback or forward DC to DC converter.

(6) In embodiment 2, explanation is given of an example where the current detection circuit 215 includes the operational amplifier 215b, but the present invention is not limited in this way. For example, as shown in FIG. 17, the current detection circuit 215 may include two transistors, Q221 and Q222.

Figure 17:
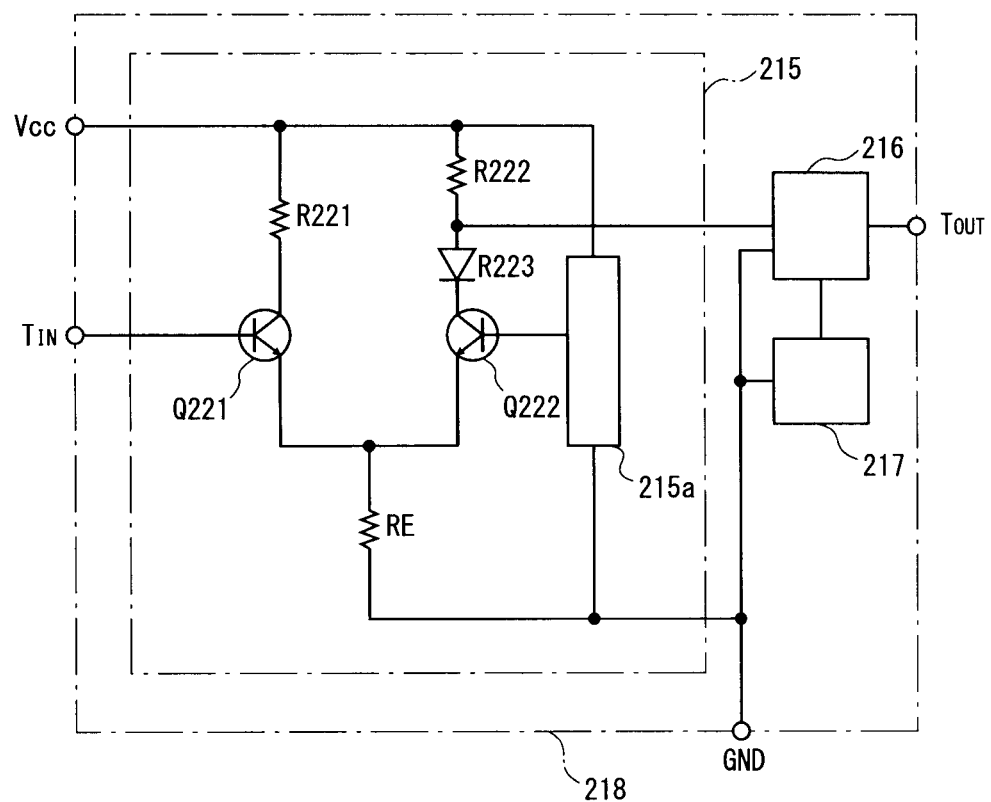
FIG. 17 is a circuit diagram of a relevant part of a lighting circuit pertaining to a modification.

Specifically, as shown in FIG. 17, the transistor Q221 is paired with the transistor Q222. The collector of each of the transistors, Q221 and Q222, is connected to the power source terminal Vcc via the resistors R221 and R222, respectively. Between the resistor R222 and the collector of the transistor Q222, a diode D223 is connected. Also, the emitter of the transistor Q222 and the emitter of the transformer Q221 are both connected to one end side of a resistor RE. Another end side of the resistor RE is connected to a ground potential. The base of the transistor Q221 is connected to the input terminal TIN of the control circuit 218, and the base of the transistor Q222 is connected to an output end of the band-gap regulator 215a.

According to this modification, since the current detection circuit 215 is formed without using an operational amplifier, it is possible to reduce the circuit size of the current detection circuit 215.

Figure 18:
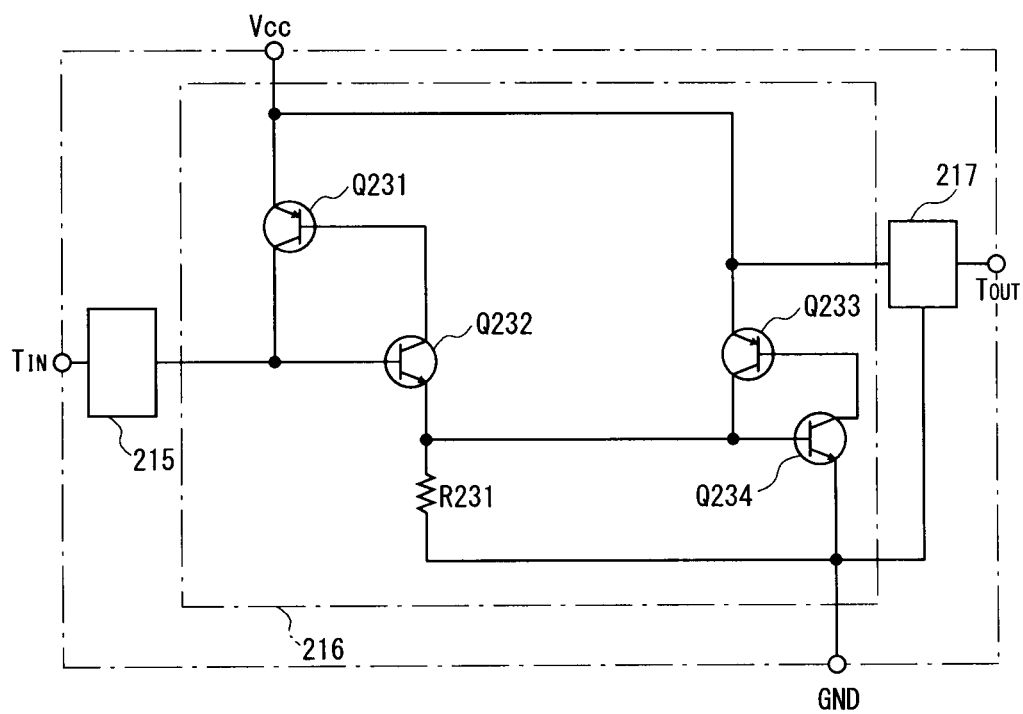
FIG. 18 is a circuit diagram of a relevant part of a lighting circuit pertaining to a modification.

(7) In embodiment 2, explanation is given of an example where the control suspending circuit 216 includes a NOR circuit 216a, and an output end of the control suspending circuit 216 is connected to the gate of the switching element Q201, but the present invention is not limited in this way. For example, as shown in FIG. 18, the control suspending circuit 216 may include a thyristor that includes a PNP transistor Q231 and an NPN transistor Q232. The output end of the control suspending circuit 216 may be connected to the gate of a thyristor that includes the PNP transistor Q233 and the NPN transistor Q234. The PNP transistor Q233 is connected to a power supply portion of the oscillation circuit 217.

The control suspending circuit 216 is configured such that the emitter of the PNP transistor Q231 is connected to the power source terminal Vcc, the collector of the PNP transistor Q231 is connected to an output end of the current detection circuit 215, and the base of the PNP transistor Q231 is connected to the collector of the NPN transistor. The collector of the NPN transistor Q232 is connected to the base of the PNP transistor Q231, the emitter of the NPN transistor Q232 is connected to the terminal GND via the resistor R231, and the base of the NPN transistor Q232 is connected to the output end of the current detection circuit 215. Finally, a node between the emitter of the NPN transistor Q232 and the resistor R231 is connected to the power supply portion of the oscillation circuit 217.

Compared to when the control suspending circuit 216 includes the NOR circuit 216a, this modification reduces the overall circuit size of the control suspending circuit 216.

(8) In embodiments 1 and 2, explanation is given of a case where a field-effect transistor (FET) is used as a switching element, but the present invention is not limited in this way. For example, such elements as a static induction transistor (SIT), a gate injection transistor (GIT), an insulated gate bipolar transistor (IGBT), or a silicon-type bipolar transistor may be used as a switching element.

(9) In embodiments 1 and 2, explanation is given that the light source is an LED light source, but the present invention is not limited in this way. For example, organic electroluminescence (EL) elements or inorganic EL elements may be used as the light source.

INDUSTRIAL APPLICABILITY

The present invention may, for example, be used in lighting fixtures such as LED lamps. Also, the present invention may, for example, be used in lighting equipment, and other lighting applications. In addition, the present invention may be utilized for purposes of aftermarket maintenance of lighting equipment (in particular, module replacement etc. in lighting equipment including such).

REFERENCE SIGNS LIST 1, 201 lighting circuit
2 LED module
3 AC power source
12, 212 rectifying and smoothing circuit
13 buck-boost DC to DC converter
14 power supply circuit
21 LEDs
23 step-down DC to DC converter
213 first voltage supply circuit
214 second voltage supply circuit
215 current detection circuit
215a band-gap regulator
216 control suspending circuit
216a AND circuit
216b buffer circuit
216c NOT circuit
217 oscillation circuit
C201, C208 electrolytic capacitors
C202, C211, NC capacitors
D1, D2, D3, D205, D206 diodes
DB1 diode bridge
NF coil Q201 switching element
R201, R202, R206, R208, R209, R210, R212, R213 resistors
T1, T201 transformer
T11, T211 primary coil
T12, T212 secondary coil
ZD1, ZD201 zener diode

The invention claimed is:

1. A lighting circuit receiving power supply from an AC power source and lighting a light source, comprising:
   a rectifying and smoothing circuit configured to rectify and smooth AC current supplied from the AC power source;
   a switching element connected to the rectifying and smoothing circuit;
   a control unit configured to perform control of switching the switching element between an on state and an off state;
   a transformer including a primary coil and a secondary coil, the primary coil connected in series to the switching element, a voltage being induced across both ends of the secondary coil by current flowing through the primary coil;
   a first voltage supply circuit configured to supply a voltage that occurs across both ends of the primary coil to the light source;
   a zener diode connected across both ends of the secondary coil; and
   a second voltage supply circuit connected between the secondary coil and a power source terminal of the control unit and configured to supply the voltage induced in the secondary coil to the power source terminal when the switching element is in the on state, wherein
   the control unit includes a current detection circuit that detects a current flowing through the zener diode, and, upon detection of a current exceeding a reference value by the current detection circuit, the control unit maintains the control of the switching element in a deactivated state, and
   a turns ratio N of the primary coil to the secondary coil satisfies $$\frac{1.2 \times X1}{Y} \leq N \leq \frac{1.2 \times X1}{Z}$$

where X1 V denotes a voltage that the AC power source supplies, Y V denotes the maximum value of a voltage range of a power source voltage of the control unit at which normal operation of the control unit is guaranteed, and Z V denotes the minimum value of the voltage range of the power source voltage of the control unit at which normal operation of the control unit is guaranteed.

2. The lighting circuit of claim 1, further comprising a resistor connected in series to the zener diode, wherein the current detection circuit detects the current flowing through the zener diode by detecting a value of a current flowing through the resistor.

3. A lamp comprising the lighting circuit of claim 1.

4. A lighting circuit receiving power supply from an AC power source and lighting a light source, comprising:
   a rectifying and smoothing circuit configured to rectify and smooth AC current supplied from the AC power source;
   a switching element connected to the rectifying and smoothing circuit;
   a control unit configured to perform control of switching the switching element between an on state and an off state;
   a transformer including a primary coil and a secondary coil, the primary coil connected in series to the switching element, a voltage being induced across both ends of the secondary coil by current flowing through the primary coil;
   a first voltage supply circuit configured to supply a voltage that occurs across both ends of the primary coil to the light source;
   a zener diode connected across both ends of the secondary coil; and
   a second voltage supply circuit connected between the secondary coil and a power source terminal of the control unit and configured to supply the voltage induced in the secondary coil to the power source terminal when the switching element is in the off state, wherein
   the control unit includes a current detection circuit that detects a current flowing through the zener diode, and, upon detection of a current exceeding a reference value by the current detection circuit, the control unit maintains the control of the switching element in a deactivated state, and
   a turns ratio N of the primary coil to the secondary coil satisfies $$\frac{X2}{Y} \leq N \leq \frac{X2}{Z}$$

where X2 V is a rated voltage of the light source, Y V denotes the maximum value of a voltage range of a power source voltage of the control unit at which normal operation of the control unit is guaranteed, and Z V denotes the minimum value of the voltage range of the power source voltage of the control unit at which normal operation of the control unit is guaranteed.

5. The lighting circuit of claim 4, wherein a switching frequency of the switching element is equal to a frequency threshold value determined by the rated voltage of the light source.

6. The lighting circuit of claim 5, wherein $f(\text{kHz})=1.26(1/V \cdot s) \times X2(V)+28.0(1/s)$ is satisfied, where the frequency threshold value is denoted as fkHz.

7. The lighting circuit of claim 4, further comprising a resistor connected in series to the zener diode, wherein the current detection circuit detects the current flowing through the zener diode by detecting a value of a current flowing through the resistor.

8. A lamp comprising the lighting circuit of claim 4.

* * * * *